US012762417B2

(12) United States Patent
Kitano et al.

(10) Patent No.: US 12,762,417 B2
(45) Date of Patent: Oct. 13, 2026

(54) EVALUATION DEVICE, LEARNING DEVICE, PREDICTION DEVICE, EVALUATION METHOD, PROGRAM, AND COMPUTER-READABLE STORAGE MEDIUM

(71) Applicants: TOPPAN Holdings Inc., Tokyo (JP); Japanese Foundation For Cancer Research, Tokyo (JP)

(72) Inventors: Shiro Kitano, Tokyo (JP); Eiji Shinozaki, Tokyo (JP)

(73) Assignees: TOPPAN HOLDINGS INC., Tokyo (JP); JAPANESE FOUNDATION FOR CANCER RESEARCH, Tokyo (JP)

( * ) Notice: Subject to any disclaimer, the term of this patent is extended or adjusted under 35 U.S.C. 154(b) by 966 days.

(21) Appl. No.: 18/069,509

(22) Filed: Dec. 21, 2022

(65) Prior Publication Data

US 2023/0121965 A1 Apr. 20, 2023

Related U.S. Application Data

(63) Continuation of application No. PCT/JP2021/024571, filed on Jun. 29, 2021.

(30) Foreign Application Priority Data

Jun. 30, 2020 (JP) ................................ 2020-113218

(51) Int. Cl.
*G06N 3/09* (2023.01)

(52) U.S. Cl.
CPC ...................................... *G06N 3/09* (2023.01)

(58) Field of Classification Search
CPC ........ G06N 3/09; G06N 3/0464; G06N 3/084; G06N 5/01; G06N 7/01; G06N 20/10;
(Continued)

(56) References Cited

U.S. PATENT DOCUMENTS 10,650,929 B1 * 5/2020 Beck ...................... G16H 50/30
12,469,129 B2 * 11/2025 Watanabe ............. G16H 50/20
(Continued)

FOREIGN PATENT DOCUMENTS

EP 3674706 A1 7/2020
JP 2016-528565 A 9/2016
(Continued)

OTHER PUBLICATIONS

Majumder et al. ("Predicting clinical response to anticancer drugs using an ex vivo platform that captures tumour heterogeneity", Nature Communications vol. 6, Article No. 6169 (2015)) (Year: 2015).*
Alcaraz et al. ("Stromal markers of activated tumor associated fibroblasts predict poor survival and are associated with necrosis in non-small cell lung cancer", 2019, p. 151-160) (Year: 2019).*
Japanese Office Action issued in counterpart Japanese Application No. 2020-205333 dated Dec. 22, 2023.
(Continued)

*Primary Examiner* — Imad Kassim
(74) *Attorney, Agent, or Firm* — XSENSUS LLP

(57) ABSTRACT

An evaluation device for evaluating an anticancer effect includes a learning information acquisition unit that acquires learning data that includes state information which indicates at least a cancer state in an unspecified subject and training data that is information about an effect of an anticancer agent obtained by administering the anticancer agent to cells collected from the subject, a learning unit that generates a prediction model by causing a learning model to perform supervised learning for a corresponding relationship between the learning data and the training data, and a prediction unit that makes related predictions to therapy using the anticancer agent with the prediction model. The learning information acquisition unit acquires the information about the anticancer effect obtained by administering the anticancer agent to a three-dimensional cell structure including cancer cells collected from the unspecified subject and cells constituting a stroma as the training data.

16 Claims, 9 Drawing Sheets

(58) Field of Classification Search
CPC ........ G16H 20/10; G16H 50/70; G16H 70/40; G16H 50/20
See application file for complete search history.

(56) References Cited

U.S. PATENT DOCUMENTS

| | | | | |
|---|---|---|---|---|
| 2011/0177062 | A1* | 7/2011 | Floch | C07K 16/26 435/375 |
| 2015/0006445 | A1 | 1/2015 | Benz et al. | |
| 2019/0385306 | A1* | 12/2019 | Kim | G06N 3/09 |
| 2020/0126636 | A1* | 4/2020 | Yu | G16B 40/20 |
| 2020/0191773 | A1 | 6/2020 | Kitano et al. | |
| 2021/0033599 | A1* | 2/2021 | Kiyuna | G16H 20/10 |
| 2021/0249132 | A1* | 8/2021 | Colborn | G06N 20/00 |
| 2021/0257067 | A1* | 8/2021 | Yabuuchi | G06N 20/00 |

FOREIGN PATENT DOCUMENTS

| | | | |
|---|---|---|---|
| WO | WO 2014/210611 | A1 | 12/2014 |
| WO | WO 2018/180007 | A1 | 10/2018 |
| WO | WO 2019/039452 | A1 | 2/2019 |
| WO | WO 2019/208703 | A1 | 10/2019 |

OTHER PUBLICATIONS

Biswanath Majumder et al: "Predicting clinical response to anticancer drugs using an ex vivo platform that captures tumour heterogeneity", Nature Communications, vol. 6, Feb. 27, 2015 (Feb. 27, 2015), p. 6169, XP055178650, DOI: 10.1038/ncomms7169.

Extended European Search Report issue in counterpart of European Application No. 21831492.0 dated Nov. 29, 2023.

* cited by examiner

620

| ID SUBJECT ID | | ... |
| --- | --- | --- |
| STATE INFORMATION | STAGE | ... |
| | AGE | ... |
| | TYPE OF CANCER | ... |
| | THERAPY HISTORY | ... |
| | PATHOLOGICAL FINDINGS | ... |
| | ... | ... |
| ... | ... | ... |

FIG. 5

621

| SUBJECT ID | | ··· |
|---|---|---|
| OMICS INFORMATION | GENOMICS | ··· |
| | TRANSCRIPTOMICS | ··· |
| | METABOLOMICS | ··· |
| | PROTEOMICS | ··· |
| | PRESENCE OR ABSENCE OF METHYLATION | ··· |
| | ··· | ··· |
| ··· | ··· | ··· |

FIG. 6

622

| DRUG ID | | ··· |
|---|---|---|
| DRUG INFORMATION | STRUCTURAL FORMULA INFORMATION | ··· |
| | PHARMACOLOGICAL INFORMATION | ··· |
| | PHYSICAL PROPERTIES INFORMATION | ··· |
| | ··· | ··· |
| ··· | ··· | ··· |

FIG. 7

622A

| ID DRUG COMBINATION ID | | ··· |
|---|---|---|
| DRUG COMBINATION INFORMATION | DRUG ID OF COMBINATION 1 | ··· |
| | DRUG ID OF COMBINATION 2 | ··· |
| | ··· | ··· |
| ··· | ··· | ··· |

FIG. 8

623

| | | | |
|---|---|---|---|
| SUBJECT ID | | | ... |
| ADMINISTRATION PERFORMANCE INFORMATION 1 | DRUG ID | | ... |
| | DOSAGE | | ... |
| | RESISTANCE | PRESENCE OR ABSENCE | ... |
| | | ANTICANCER AGENT NAME | ... |
| | | ADMINISTRATION TIMING | ... |
| | ... | | ... |
| ADMINISTRATION PERFORMANCE INFORMATION 2 | ID DRUG COMBINATION ID | | ... |
| | DOSAGE | | ... |
| | RESISTANCE | ... | ... |
| | ... | | ... |
| ... | ... | | ... |

FIG. 9

624

| | | |
|---|---|---|
| SUBJECT ID | | ... |
| DRUG EFFECTIVENESS INFORMATION 1 | ADMINISTRATION PERFORMANCE INFORMATION | ... |
| | EFFECTIVENESS LEVEL | ... |
| | PRESENCE OR ABSENCE OF RESISTANCE ACQUISITION | ... |
| | ... | ... |
| DRUG EFFECTIVENESS INFORMATION 2 | ADMINISTRATION PERFORMANCE INFORMATION | ... |
| | EFFECTIVENESS LEVEL | ... |
| | PRESENCE OR ABSENCE OF RESISTANCE ACQUISITION | ... |
| | ... | ... |
| ... | ... | ... |

EVALUATION DEVICE, LEARNING DEVICE, PREDICTION DEVICE, EVALUATION METHOD, PROGRAM, AND COMPUTER-READABLE STORAGE MEDIUM

CROSS REFERENCE TO RELATED APPLICATIONS

This application is a continuation application based on PCT International Patent Application No. PCT/JP2021/024571, filed on Jun. 29, 2021, which claims priority to Japanese Patent Application No. 2020-113218, filed on Jun. 30, 2020, in the Japan Patent Office. The contents of both the Japanese Patent Application and the PCT Application are incorporated herein by reference.

TECHNICAL FIELD

The present invention relates to an evaluation device, a learning device, a prediction device, an evaluation method, a program, and a computer-readable storage medium.

BACKGROUND ART

A technology for supporting patient therapy using signal processing technology exists. For example, published Japanese Translation No. 2016-528565 of the PCT International Publication (Patent Literature 1) discloses a technology for determining effectiveness when drug administration therapy is performed on a patient based on a correlation between omics data in diseased cells collected from the patient, and drug sensitivity (hereinafter also referred to as drug efficacy) .

There are also methods of evaluating drug efficacy in cells ex vivo. For example, PCT International Publication No. WO 2019/039452 (Patent Literature 2) discloses a method of evaluating an anticancer effect of an anticancer agent by culturing cancer cells in the presence of immune cells and an anticancer agent. In Patent Literature 2, it is possible to evaluate an influence on cancer cells that are closer to those of a living body than cells grown on a two-dimensional plane by administering an anticancer agent to a three-dimensional cell structure in which a stroma, for example, endothelial cells, fibroblast cells, or the like, coexisting with cancer cells in vivo, where the cancer cells are allowed to coexist.

If the technology of Patent Literature 1 is applied to the cell structure described in Patent Literature 2, it is possible to determine the effectiveness of the therapy for the patient more accurately using a drug efficacy evaluation result in a state closer to that of the living body.

SUMMARY OF THE INVENTION

However, in relation to cancer therapy, depending on the type of cancer, the stage of cancer, the age and so on of the patient, there are significant differences in how difficult therapy is. For this reason, as in Patent Literature 1, there is a high possibility that the usefulness of drug administration that takes into account only cell omics data will deviate from the effectiveness of drugs that are actually administered to cancer patients.

The present invention has been made in view of the above circumstances and provides an evaluation device, a learning device, an evaluation method, and a program capable of evaluating the efficacy of an anticancer agent which takes into consideration not only cell omics information, but other information about a patient's medical condition when administering an anticancer agent.

An evaluation device for evaluating an anticancer effect includes: a learning information acquisition unit that acquires learning data that includes state information, which is information about cancer in an unspecified subject and indicates at least a cancer state in the unspecified subject, and training data that is information about an effect of an anticancer agent obtained by administering the anticancer agent to cells collected from the subject; a learning unit that generates a prediction model for making predictions related to therapy using the anticancer agent by causing a learning model to perform supervised learning for a corresponding relationship between the learning data and the training data acquired by the learning information acquisition unit; a storage unit that stores the prediction model generated by the learning unit; an input information acquisition unit that acquires input information that is information about cancer in a subject serving as a prediction target; and a prediction unit that makes related predictions to the therapy using the anticancer agent with the input information and the prediction model, wherein the learning information acquisition unit acquires the information about the anticancer effect obtained by administering the anticancer agent to a three-dimensional cell structure including cancer cells collected from the unspecified subject and cells constituting a stroma as the training data.

A learning device includes a learning information acquisition unit that acquires learning data which is information about cancer in an unspecified subject and training data that is information about an effect of an anticancer agent obtained by administering the anticancer agent to cells collected from the subject; and a learning unit that generates a prediction model for making a prediction related to therapy using the anticancer agent by causing a learning model to perform supervised learning for a corresponding relationship between the learning data and the training data acquired by the learning information acquisition unit.

A prediction device includes: an input information acquisition unit that acquires input information that is information about cancer in a subject serving as a prediction target; and a prediction unit that makes related predictions related to therapy using an anticancer agent with the input information and a prediction model, wherein the prediction model is a model for making the prediction related to the therapy using the anticancer agent generated by causing a learning model to perform supervised learning for a corresponding relationship between learning data that is information about cancer in an unspecified subject and training data that is information about an effect of the anticancer agent obtained by administering the anticancer agent to cells collected from the subject.

An evaluation method of evaluating an anticancer effect includes: acquiring, by a learning information acquisition unit, learning data that is information about cancer in an unspecified subject and training data that is information about an effect of an anticancer agent obtained by administering the anticancer agent to cells collected from the subject; generating, by a learning unit, a prediction model for making a prediction related to therapy using the anticancer agent by causing a learning model to perform supervised learning for a corresponding relationship between the learning data and the training data acquired by the learning information acquisition unit; storing, by a storage unit, the prediction model generated by the learning unit; acquiring, by an input information acquisition unit, input information that is information about cancer in a subject serving as a prediction target; and predicting, by a prediction unit, the prediction related to the therapy using the anticancer agent with the input information and the prediction model.

A program for causing a computer to operate as the above-described learning device, wherein the program causes the computer to function as each part provided in the learning device.

A program for causing a computer to operate as the above-described prediction device, wherein the program causes the computer to function as each part provided in the prediction device.

A non-transitory computer-readable storage medium storing a program that causes a computer to operate as the above-described learning device, wherein the program causes the computer to function as each part provided in the learning device.

A non-transitory computer-readable storage medium storing a program causing a computer to operate as the above-described prediction device, wherein the program causes the computer to function as each part provided in the prediction device.

According to at least one aspect of the present invention, it is possible to determine the effectiveness of drug administration to a patient or the effectiveness of drug administration to other patients having similar diseases using a cell structure having a three-dimensional structure produced from cells collected from the patient.

BRIEF DESCRIPTION OF DRAWINGS

FIG. 5 is a diagram showing an example of a configuration of omics information 621 according to an embodiment of the present invention.

FIG. 6 is a diagram showing an example of a configuration of drug information 622 according to an embodiment of the present invention.

FIG. 7 is a diagram showing an example of a configuration of drug information 622A according to an embodiment of the present invention.

FIG. 8 is a diagram showing an example of a configuration of administration performance information 623 according to an embodiment of the present invention.

FIG. 9 is a diagram showing an example of a configuration of drug effectiveness information 624 according to an embodiment of the present invention.

DESCRIPTION OF EMBODIMENTS

Figure 1:
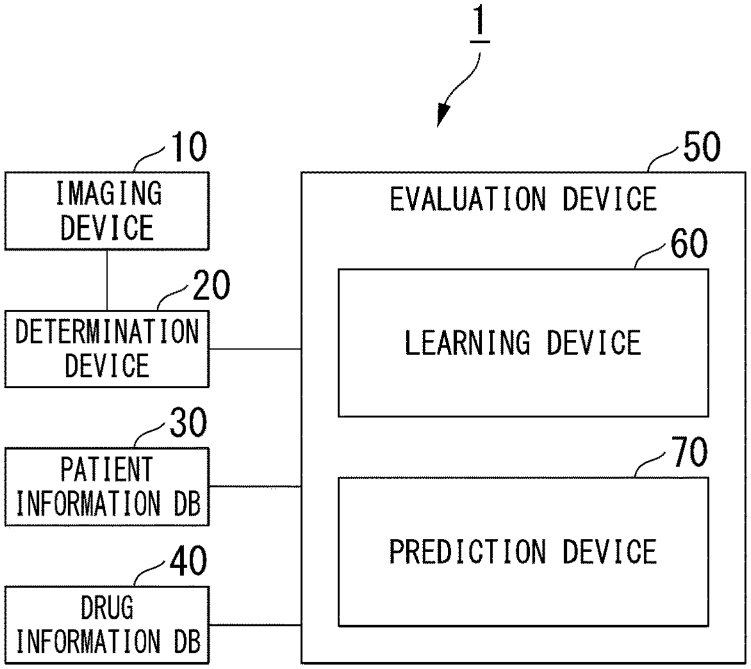
FIG. 1 is a block diagram showing an example of a configuration of an anticancer agent effect evaluation device 1 according to an embodiment of the present invention.

Hereinafter, embodiments of the present invention will be described with reference to the drawings.

An anticancer agent effect evaluation device 1 is a device that uses artificial intelligence (AI) technology to predict anticancer agents effective against cancer cells in patients. The patient here is a patient to whom an anticancer agent is administered in cancer therapy and is an example of a "subject."

The anticancer agent effect evaluation device 1 treats results of evaluating anticancer effects of anticancer agents that act on cancer cells in unspecified subjects as so-called big data. The anticancer agent effect evaluation device 1 predicts an anticancer agent effectiveness against the patient's cancer cells using a trained model (a prediction model to be described later on) that has been trained in supervised learning using the big data.

In a present embodiment, the anticancer effect of an anticancer agent acting on cancer cells of a subject is evaluated ex vivo. Specifically, the anticancer effect associated with a single anticancer agent, a combination of immune cells and an anticancer agent, or a combination of multiple anticancer agents may be evaluated by culturing a three-dimensional cell structure containing cancer cells collected from the subject in the presence of the single anticancer agent, the combination of the immune cells and the anticancer agent, or the combination of the multiple anticancer agents. In the present embodiment and the present specification, the term "anticancer agent" mentioned therein may simply include a single anticancer agent, a combination of multiple anticancer agents, and a combination of immune cells and an anticancer agent. The three-dimensional cell structure herein is a three-dimensional structure and includes cells in which cancer cells have an environment close to an environment of cancer cells in vivo as compared with cells grown on a two-dimensional plane. A three-dimensional cell structure may be, for example, a cell structure organized in a state in which cancer cells collected from a subject are allowed to coexist with a stroma, for example, endothelial cells, fibroblast cells, and the like, coexisting with cancer cells in an in vivo environment. Preferably, the three-dimensional cell structure is, for example, the cell structure described in Patent Literature 2. Using the evaluation result of the evaluation using the three-dimensional cell structure, it is possible to obtain more reliable evaluation with respect to the anticancer effects of anticancer agents.

In the present embodiment and the present specification, a "three-dimensional cell structure" may be a three-dimensional structure in which a plurality of cell layers are laminated. The "cell layers" are layers composed of a group of cells and stroma that are present in a direction perpendicular to a thickness direction with the cell nuclei not overlapping each other in the thickness direction when observed at a magnification at which a cell nucleus may be recognized, i.e., at which the entire thickness of the stained section is included in the field of view in a cross-sectional image of a section of the cell structure in the thickness direction. Also, the term "layered" indicates that two or more different cell layers are stacked in the thickness direction. The three-dimensional cell structure used in the present embodiment is composed of cells constituting the stroma and cancer cells. The cells constituting the stroma may or may not contain immune cells.

The cells including stromal cells and cancer cells that constitute the cell structure according to the present embodiment are not particularly limited. The cells may be cells obtained from animals, cells obtained by culturing cells collected from animals, cells obtained by applying various types of treatments to cells collected from animals, or cultured cell lines. In the case of cells obtained from animals, the collection site is not particularly limited. The cells may be somatic cells derived from bone, muscle, viscus, nerve, brain, bone, skin, blood, etc., reproductive cells, or embryonic stem cells (ES cells). Also, the organism species from which the cells constituting the cell structure according to the present embodiment are derived is not particularly limited. For example, the cells may be derived from humans or animals such as monkeys, dogs, cats, rabbits, pigs, cows, mice, and rats. The cells obtained by culturing cells collected from animals may be primary cultured cells or subcultured cells. Also, the cells obtained by applying various treatments may include induced pluripotent stem cells (iPS cells) or cells after differentiation induction. Preferably, the cancer cells are cells collected from animals. More preferably, the cancer cells are primary cultured cells. The cell structure according to the present embodiment may be composed of only cells derived from the same organism species, or cells derived from several types of organism species.

Examples of the stroma cells include endothelial cells, fibroblast cells, neuronal cells, mast cells, epithelial cells, myocardial cells, hepatic cells, pancreatic islet cells, tissue stem cells, smooth muscle cells, and the like. The types of stroma cells contained in the cell structure according to the present embodiment may be one or two or more. The cell type of stromal cells contained in the cell structure according to the present embodiment is not particularly limited and may be suitably selected in consideration of the origin and type of cancer cells to be contained, the type of immune cells used for evaluation, the type of anticancer agent used for evaluation, the in vivo environment in which the target anticancer activity is to be exhibited, and the like.

A vascular network is important for the growth and activity of cancer cells. For this reason, the three-dimensional cell structure according to the present embodiment preferably includes the vascular network. That is, in the cell structure according to the present embodiment, the vascular network is constructed three-dimensionally inside, and a tissue closer to that of the living body is preferably constructed. The vascular network may be formed only on the inside of the cell structure or may be formed such that at least a part thereof is exposed on the front surface or the bottom surface of the cell structure. Also, in the present embodiment and the present specification, the term "vascular network" indicates a network structure having a plurality of branches like a vascular network in biological tissues.

The vascular network may be formed by including endothelial cells constituting blood vessels as stromal cells. A vascular endothelial cell may be used as the endothelial cell included in the three-dimensional cell structure according to the present embodiment. When the three-dimensional cell structure according to the present embodiment includes a vascular network structure, the cells other than the endothelial cells in the three-dimensional cell structure are preferably cells constituting surrounding tissues of vessels in a living body because the endothelial cells may easily form a vascular network maintaining the original function and shape, the cells other than the endothelial cells are more preferably cells containing at least fibroblast cells because the cells are closer to those of the in vivo cancer microenvironment, and the cells other than the endothelial cells are more preferably cells containing vascular endothelial cells and fibroblast cells. Also, the cells other than endothelial cells contained in the cell structure may be cells derived from the same species as that of the endothelial cells or cells derived from a different species.

Non-limiting examples of the cancer from which cancer cells are derived, to be included in the three-dimensional cell structure according to the present embodiment include breast cancer (e.g., invasive ductal carcinoma, ductal carcinoma in situ, and inflammatory breast cancer), prostate cancer (e.g., hormone-dependent prostate cancer and hormone-independent prostate cancer), pancreatic cancer (e.g., pancreatic duct cancer), gastric cancer (e.g., a papillary adenocarcinoma, a mucinous adenocarcinoma, and an adenosquamous carcinoma), lung cancer (e.g., non-small-cell lung cancer, small-cell lung cancer, and malignant mesothelioma), colon cancer (e.g., a gastrointestinal stromal tumor), rectal cancer (e.g., a gastrointestinal stromal tumor), colorectal cancer (e.g., familial colorectal cancer, hereditary nonpolyposis colorectal cancer, and a gastrointestinal stromal tumor), small intestinal cancer (e.g., non-Hodgkin's lymphoma and a gastrointestinal stromal tumor), esophageal cancer, duodenal cancer, tongue cancer, pharyngeal cancer (e.g., nasopharyngeal cancer, oropharyngeal cancer, and hypopharyngeal cancer), head and neck cancer, salivary gland cancer, a brain tumor (e.g., a pineal astrocytoma, a pilocytic astrocytoma, a diffuse astrocytoma, and an anaplastic astrocytoma), a neurilemmoma, liver cancer (e.g., primary liver cancer and extrahepatic bile duct cancer), renal cancer (e.g., renal cell cancer and transitional cell cancer of the renal pelvis and ureter), gallbladder cancer, bile duct cancer, pancreatic cancer, hepatoma, endometrial cancer, cervical cancer, ovarian cancer (e.g., epithelial ovarian cancer, an extragonadal germ cell tumor, an ovarian germ cell tumor, and an ovarian low-malignant potential tumor), bladder cancer, urethral cancer, skin cancer (e.g., an intraocular (ocular) melanoma and a Merkel cell carcinoma), a hemangioma, malignant lymphoma (e.g., reticulosarcoma, lymphosarcoma, and Hodgkin's disease), a melanoma (a malignant melanoma), thyroid cancer (e.g., medullary thyroid cancer), parathyroid cancer, nasal cancer, paranasal cancer, a bone tumor (e.g., an osteosarcoma, an Ewing's tumor, a uterine sarcoma, and a soft-tissue sarcoma), metastatic medulloblastoma, hemangiofibroma, dermatofibrosarcoma protuberans, a retinal sarcoma, penile cancer, testicular tumor, pediatric solid cancer (e.g., a Wilms tumor and a pediatric renal tumor), Kaposi sarcoma, Kaposi sarcoma caused by AIDS, a tumor of the maxillary sinus, fibrous histiocytoma, leiomyosarcoma, rhabdomyosarcoma, chronic myeloproliferative disorders, leukemia (e.g., acute myelogenous leukemia and acute lymphoblastic leukemia), and the like.

The three-dimensional cell structure according to the present embodiment may be a structure where the cancer cells are scattered throughout, or a structure in which cancer cells are present only in a specific cell layer. In the three-dimensional cell structure according to the present embodiment, when cancer cells are present only in a specific cell layer, a position in a structure of a cell layer (a cancer cell layer) containing cancer cells in the structure is not particularly limited. When a three-dimensional cell structure is cultured in the presence of an anticancer agent, the cancer cell layer is provided inside the structure instead of on the top surface of the structure, such that it is possible to evaluate anticancer effects including the ability of the anticancer agent to infiltrate and reach the cancer cells in the structure.

The above-described three-dimensional cell structure may also be produced by a production method described in Patent Literature 2. The production method described in Patent Literature 2 includes the following steps (a) to (c):

(a) a step of obtaining a mixture by mixing cells and an extracellular matrix component in a cationic buffer;
(b) a step of seeding the mixture obtained at step (a) in a cell culture container; and
(c) a step of obtaining a cell structure in which the cells are laminated in multiple layers in the cell culture container after step (b).

Examples of the cationic buffer include tris-hydrochloric acid buffers, tris-maleic acid buffers, bis-tris buffers, HEPES, and the like. The concentration and pH of the cationic substance in the cationic buffer (e.g., tris in a tris-hydrochloric acid buffer) are not particularly limited, as long as they do not adversely affect the cell growth and the construction of the cell structure.

Examples of the strong electrolyte polymer include, but are not limited to, glycosaminoglycans such as heparin, chondroitin sulfate (e.g., chondroitin 4-sulfate, or chondroitin 6-sulfate), heparan sulfate, dermatan sulfate, keratan sulfate, hyaluronic acid, and the like; dextran sulfate, rhamnan sulfate, fucoidan, carrageenan, polystyrene sulfonic acid, polyacrylamide-2-methylpropanesulfonic acid, polyacrylic acid, and derivatives thereof. The mixture prepared in step (a) may be mixed with only one type of strong electrolyte polymer, or two or more types of strong electrolyte polymers in combination.

Examples of the extracellular matrix component include collagen, laminin, fibronectin, vitronectin, elastin, tenascin, entactin, fibrillin, proteoglycan, and modifications or variants thereof. Examples of the proteoglycan include chondroitin sulfate proteoglycan, heparan sulfate proteoglycan, keratan sulfate proteoglycan, and dermatan sulfate proteoglycan. The mixture prepared in step (a) may be mixed with only one type of extracellular matrix component, or two or more types of extracellular matrix components in combination.

In the present embodiment, the anticancer agents acting on the cancer cells may be drugs for use in the cancer therapy and include not only drugs that directly act on cancer cells, such as drugs having cytotoxicity, but also drugs that do not have cytotoxicity but suppress the growth of cancer cells, and the like. Examples of the anticancer agent that does not have cytotoxicity include: drugs that do not directly attack cancer cells, but exhibit the function to suppress the growth of cancer cells, blunt the activity of cancer cells, or kill cancer cells, by the cooperative action with in vivo immune cells or other drugs; and drugs that suppress the growth of cancer cells by impairing cells other than cancer cells and tissue. The anticancer agent used in the present embodiment may be known drugs having anticancer activity, or candidate compounds for a novel anticancer agent (a new drug).

The anticancer agent having cytotoxicity is not particularly limited and examples thereof include molecular targeted drugs, alkylating agents, antimetabolites represented by 5-FU-based anticancer agents, plant alkaloids, anticancer antibiotics, platinum derivatives, hormonal agents, topoisomerase inhibitors, microtubule inhibitors, and compounds classified as biological response modifiers.

The anticancer agent not having cytotoxicity is not particularly limited and examples thereof include angiogenesis inhibitors, prodrugs of an anticancer agent, drugs that regulate intracellular metabolism enzyme activity associated with the metabolism of an anticancer agent or prodrugs thereof (hereinafter referred to as "intracellular enzyme regulators" in the specification), immunotherapy agents, and the like. Other examples include drugs that are ultimately involved in anticancer activity by increasing the function of an anticancer agent or improving the in vivo immune function.

The angiogenesis inhibitors may be compounds that are expected to have angiogenesis inhibitory activity, and may be known angiogenesis inhibitors or candidate compounds for novel angiogenesis inhibitors. Examples of known angiogenesis inhibitors include Avastin, EYLEA, Suchibaga, CYRAIVIZA (registered trademark) (also known as ramucirumab, produced by Eli Lilly), BMS-275291 (produced by Bristol-Myers), Celecoxib (produced by Pharmacia/Pfizer), EMD121974 (produced by Merck), Endostatin (produced by EntreMed), Erbitaux (produced by ImClone Systems), Interferon-α (produced by Roche), LY317615 (produced by Eli Lilly), Neovastat (produced by Aeterna Laboratories), PTK787 (produced by Abbott), SU6688 (produced by Sugen), Thalidomide (produced by Celgene), VEGF-Trap (produced by Regeneron), Iressa (registered trademark) (also known as gefitinib, produced by AstraZeneca), Caplerusa (registered trademark) (also known as vandetanib, produced by AstraZeneca), Recentin (registered trademark) (also known as cediranib, produced by AstraZeneca), VGX-100 (produced by Circadian Technologies), VDlandcVE 199, VGX-300 (produced by Circadian Technologies), sVEGFR2, hF4-3C5, Nexavar (registered trademark) (also known as sorafenib, produced by Bayer Yakuhin), Vortrient (registered trademark) (also known as pazopanib, produced by GlaxoSmithKline), Sutent (registered trademark) (also known as sunitinib, produced by Pfizer), Inlyta (registered trademark) (also known as axitinib, produced by Pfizer), CEP-11981 (produced by Teva Pharmaceutical Industries), AMG-386 (also known as trebananib, produced by Takeda Yakuhin), anti-NRP2B (produced by Genentech), Ofev (registered trademark) (also known as nintedanib, produced by Boehringer Ingelheim), AMG706 (also known as motesanib, produced by Takeda Yakuhin), and the like.

Prodrugs of anticancer agents are drugs that are converted into activators having anticancer activity by organs, such as the liver, and intracellular enzymes of cancer cells. Cytokine networks enhance intracellular enzyme activity to thereby increase the number of activators, and result in the enhancement of anti-tumor effects; thus, these prodrugs may be exemplified as drugs involved in anticancer activity.

Examples of intracellular enzyme regulators include gimeracil, which does not have a direct anti-tumor effect when used alone, but is involved in anticancer activity by inhibiting a degrading enzyme (dihydropyrimidine dehydrogenase: DPD) of 5-FU-based anticancer agents.

Immunotherapy agents are drugs that obtain an anticancer effect by activating immune functions or motility of immune cells to thereby improve immune functions. Examples of the immunotherapy agents include drugs used for biological response modifier therapy (hereinafter abbreviated as "BRM preparations"), cytokine preparations formed from cytokines, which are secreted from immune cells and involved in migration and invasion, cancer immune checkpoint inhibitors, cancer vaccines, and cancer viruses. Examples of the BRM preparations include Krestin, Lentinan, and OK-432.

Examples of the cytokine preparations include interleukins such as IL-8 and IL-2; interferons such as IFN-α, IFN-β, and IFN-γ; and chemokines such as CCL3, CCL4, CCL5, CXCL9, CXCL10, CXCL11, CXCL16/CXCR6, and CX3CL1/CX3CR1.

The cancer immune checkpoint inhibitors are substances that specifically inhibit a function of proteins which are present on the surface of cancer cells or immune cells and involved in reduction of immune function against cancer cells. Examples of such proteins include PD-1, PD-L1, PD-L2, CD4, CD8, CD19, CD28, CD80/86, B7, Galectin-9, HVEM, CTLA-4, TIM-3, BTLA, MHC-II, LAG-3, and TCR. The cancer immune checkpoint inhibitors are preferably specific monoclonal antibody drugs targeting these proteins. Specific examples of the cancer immune checkpoint inhibitors include nivolumab (Opdivo), pembrolizumab (Keytruda), atezolizumab (Tecentriq), ipilimumab (Yervoy), tremelimumab, durvalmab, and avelumab.

Immune cells are cells involved in immunity. Specific examples of the immune cells include lymphocytes, macrophages, and dendritic cells. Lymphocytes include T cells, B cells, NK cells, plasma cells, and the like.

The number of types of immune cells used in the present embodiment may be one or two or more. Although the immune cells that may be used in the present embodiment are not particularly limited as long as they are immune cells, immune cells present around the actual cancer microenvironment and involved in a mechanism of attacking the cancer cells by an immune reaction are preferred. Specifically, in the present embodiment, immune cells preferably include at least one type selected from the group consisting of leukocytes and lymphocytes, and more preferably include T cells.

Plasma peripheral blood mononuclear cells (PBMC) may be used as the immune cells. PBMC include lymphocytes and monocytes. The monocytes include macrophages. The lymphocytes include NK cells, B cells, and T cells. In addition to PBMC, these components may be used singly or in combination. PBMC may be isolated and purified from blood, or a buffy coat prepared from blood may also be used as it is. In the buffy coat, PBMC are contained together with other components. Preparation of the buffy coat from blood may be performed by conventional methods such as centrifugal separation. Some immune cells include a plurality of types that are slightly different in properties, like the ABO blood groups, even in the same component. In the present embodiment, any one type of immune cells may be used or a plurality of types of immune cells may be used in combination, if necessary.

The immune cells may be those obtained from a living body, cultured cell lines, or cells that are artificially altered or modified in vivo. When immune cells collected from a cancer patient are used, immune cells, particularly PBMC, isolated from the peripheral blood or a tumor of the cancer patient are preferably used. Also, the artificially altered or modified immune cells are preferably those having an immune function artificially altered to enhance anticancer activity. Examples of such immune cells having altered immune function include modified T cells that are used for gene-modified T cell therapy using chimeric antigen receptors (CAR).

FIG. 1 is a block diagram showing an example of a configuration of the anticancer agent effect evaluation device 1 according to the present embodiment. The anticancer agent effect evaluation device 1 includes, for example, an imaging device 10, a determination device 20, a patient information DB 30, a drug information DB 40, and an evaluation device 50. The imaging device 10 is connected to and able to communicate with the determination device 20. The determination device 20, the patient information DB 30, and the drug information DB 40 are connected to and able to communicate with the evaluation device 50.

The imaging device 10 is a camera that images a three-dimensional cell structure serving as a target for evaluating an anticancer effect of an anticancer agent. The imaging device 10 periodically images a culturing process in a three-dimensional cell structure cultured in the presence of immune cells and an anticancer agent. The imaging device 10 transmits information (image data) of an image of the imaged three-dimensional cell structure to the determination device 20. Although an example of the case where the culturing process is imaged at fixed time intervals, has been described above, the present invention is not to be construed as limiting thereof. It is only necessary for the imaging device 10 to image the culturing process at a specific timing. The specific timing may be a timing preset in the imaging device 10 or may be any timing determined by an imaging person or the like that performs imaging with the imaging device 10.

The determination device 20 is a computer device such as a cloud device, a server device, or a personal computer (PC). The determination device 20 includes, for example, a communication unit, a storage unit, and a control unit. The communication unit communicates with the imaging device 10 and the evaluation device 50. The storage unit stores variables, various types of data, programs, and the like necessary for implementing the functions of the determination device 20. The control unit evaluates the anticancer effect of the anticancer agent using the image of the three-dimensional cell structure acquired from the imaging device 10 via the communication unit.

For example, when the cancer cells contained in the three-dimensional cell structure are labeled with a fluorescent substance, the control unit determines whether or not each pixel of a region where the three-dimensional cell structure is imaged has been stained with fluorescence on the basis of an RGB value of each pixel and the like in the image. Alternatively, when an image is captured with the resolution for enabling individual cells to be identified in an imaging process performed via a microscope or the like, the control unit may count the number of cells stained with fluorescence.

The control unit determines whether or not there is an anticancer effect using results of image analysis. For example, if a ratio of an area stained with fluorescence to an area of the entire three-dimensional cell structure is reduced compared to a ratio before administration of the anticancer agent, the control unit determines that the anticancer agent has an anticancer effect. Alternatively, when the number of cancer cells (the number of cells stained with fluorescence) is reduced compared to the number of cancer cells before administration of the anticancer agent, the control unit may determine that the anticancer agent has an anticancer effect. Alternatively, the control unit may determine that there is an anticancer effect when a phenomenon suggesting that the number of cancer cells has decreased, such as shrinkage of the vascular network, has been identified from the image.

Also, when it is determined that there is an anticancer effect, the control unit may determine a degree of anticancer effect. For example, the control unit determines the degree of anticancer effect using a plurality of levels such as a high level, a normal level, and a low level in accordance with the number of days required for cancer cells to decrease by a predetermined percentage (for example, 50%). The control unit notifies the evaluation device 50 of information indicating an anticancer agent administered to the three-dimensional cell structure, a result of determining whether or not the anticancer agent has an anticancer effect, a degree of anticancer effect if there is an anticancer effect, and the like as an administration performance information 623 or a drug effectiveness information 624, both of which are explained later on, via the communication unit.

Although an example in which the determination device 20 notifies the evaluation device 50 of information about an anticancer effect and the like has been described above, the present invention is not limited thereto. It is only necessary for the evaluation device 50 to acquire at least information about the anticancer effect and the like. For example, the information about the anticancer effect and the like may be determined by an external device other than the determination device 20, a person in charge of follow-up observation, or the like. The information about the anticancer effect and the like may be manually input through an input operation by a person in charge or the like. In this case, the imaging device 10 or the determination device 20 may be omitted from the anticancer agent effect evaluation device 1.

The patient information DB 30 is a database (DB) that stores information about patients including subjects, and is, for example, a computer device such as a cloud device, a server device, or a personal computer (PC). The patient information DB 30 includes, for example, a communication unit, a storage unit, an input unit, and a control unit. The communication unit communicates with the evaluation device 50. The storage unit stores variables, various types of data, programs, and the like necessary for implementing the functions of the patient information DB 30. The storage unit stores information about patients. The information about the patients may be any information, but includes, for example, information (an omics information 621 to be described later on) about cells collected from the patient, information (a state information 620 to be described later on) indicating cancer states in the patients, and the like. The input unit acquires information input via an input device such as a keyboard. The input unit, for example, acquires information about the patients and causes the storage unit to store the acquired information. The control unit notifies the evaluation device 50 of patient-related information stored in the storage unit via the communication unit.

The drug information DB 40 is a DB that stores information about anticancer agents (drugs), and is a computer device such as a cloud device, a server device, or a PC. The drug information DB 40 includes, for example, a communication unit, a storage unit, an input unit, and a control unit. The communication unit communicates with the evaluation device 50. The storage unit stores variables, various types of data, programs, and the like necessary for implementing the functions of the drug information DB 40. The storage unit stores information about anticancer agents. The information about the anticancer agents may be any information, and may include, for example, information (a drug information 622 to be described later on) indicating the structural formula, pharmacology, physical properties, and the like of the drug. The input unit acquires information input via the input device such as a keyboard. The input unit acquires, for example, information about the anticancer agent, and causes the storage unit to store the acquired information. The control unit notifies the evaluation device 50 of the information about the anticancer agent stored in the storage unit via the communication unit.

The evaluation device 50 includes, for example, a learning device 60 and a prediction device 70. Both the learning device 60 and the prediction device 70 are computer devices such as cloud devices, server devices, and PCs.

The learning device 60 generates a prediction model by training the learning model in supervised learning. The prediction model here is a model for predicting the anticancer effect when an anticancer agent is administered to a patient from information such as the cancer state of the patient. The prediction device 70 predicts the anticancer effect when the anticancer agent is administered to the patient using the prediction model generated by the learning device 60.

Figure 2:
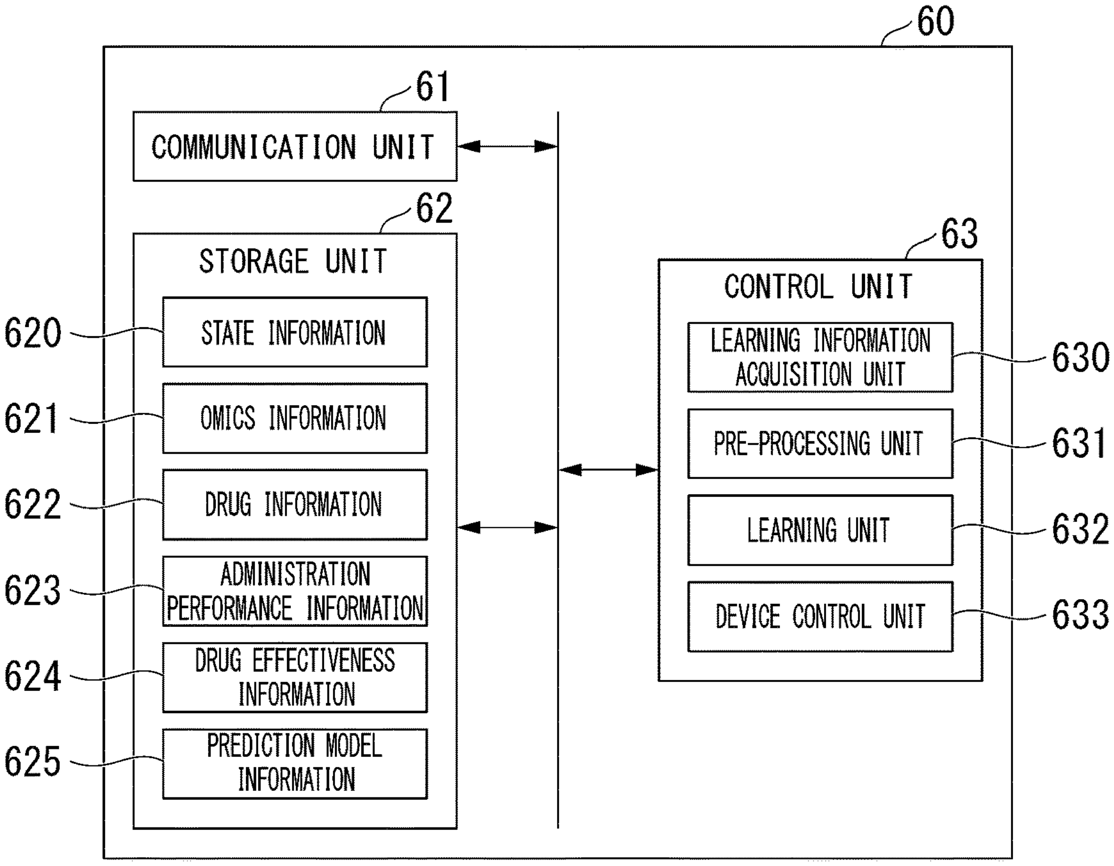
FIG. 2 is a block diagram showing an example of a configuration of a learning device 60 according to an embodiment of the present invention.

FIG. 2 is a block diagram showing an example of a configuration of the learning device 60 according to the present embodiment. The learning device 60 includes, for example, a communication unit 61, a storage unit 62, and a control unit 63. The communication unit 61 communicates with external devices. The external devices here are the determination device 20, the patient information DB 30, the drug information DB 40, and the prediction device 70.

The storage unit 62 includes a hard disk drive (HDD), a flash memory, an electrically erasable programmable read only memory (EEPROM), a random access read/write memory (RAM), a read only memory (ROM), or any combination of these storage media. The storage unit 62 stores, for example, the state information 620, the omics information 621, the drug information 622, the administration performance information 623, the drug effectiveness information 624, and prediction model information 625.

The state information 620 is information indicating a cancer state in the subject. The state information 620 includes all or part of information about the patient transmitted from the patient information DB 30 to the evaluation device 50. The omics information 621 is information about cancer cells collected from the subject. The omics information 621 includes all or part of information about the patient transmitted from the patient information DB 30 to the evaluation device 50. The drug information 622 is information about anticancer agents. The drug information 622 includes information about anticancer agents transmitted from the drug information DB 40 to the evaluation device 50. The administration performance information 623 is information indicating the administration performance of the anticancer agent administered to the cancer cells collected from the subject. The administration performance information 623 includes information about the anticancer agent administered to the three-dimensional cell structure transmitted from the determination device 20 to the evaluation device 50.

The drug effectiveness information 624 is information indicating the anticancer effect of the anticancer agent administered to the cancer cells collected from the subject. In addition to information indicating whether or not the anticancer agent is effective against cancer cells and information indicating a degree of effectiveness, the information indicating the anticancer effect may include information indicating whether cancer cells have acquired resistance to the anticancer agent. The drug effectiveness information 624 includes, for example, a determination result of determining whether or not there is an anticancer effect transmitted from the determination device 20 to the evaluation device 50. However, the present invention is not limited to this and the drug effectiveness information 624 may include a result of performing human evaluation from the drug administration result as well as a determination result of the determination device 20. The prediction model information 625 is information indicating a prediction model generated by the learning device 60.

The control unit 63 is implemented, for example, by causing a central processing unit (CPU) provided as hardware in the learning device 60 to execute a program stored in the storage unit 62. The control unit 63 includes, for example, a learning information acquisition unit 630, a pre-processing unit 631, a learning unit 632, and a device control unit 633.

The learning information acquisition unit 630 acquires learning information. The learning information is information for use in learning when supervised learning is performed. The learning information includes, for example, the state information 620, the omics information 621, the administration performance information 623, and the drug effectiveness information 624. The learning information acquisition unit 630 acquires the learning information with reference to the storage unit 62 and outputs the acquired learning information to the pre-processing unit 631.

The pre-processing unit 631 performs preliminary processing (pre-processing) when supervised learning is performed. Specifically, the pre-processing unit 631 generates a learning dataset. A dataset for learning is a combination of learning data and training data. The pre-processing unit 631 designates the state information 620 of the subject, the omics information 621, the administration performance information 623, and the drug information 622 of the anticancer agent administered to the cancer cells of the subject as the learning data. The pre-processing unit 631 uses the drug effectiveness information 624 of the subject corresponding to the learning data as the training data. The pre-processing unit 631 generates a learning dataset by combining the learning data and the training data.

The learning unit 632 generates a prediction model by training the learning model in supervised learning using the learning dataset. The learning model here is, for example, a deep learning model such as a convolutional neural network (CNN). Although an example in which the learning model is a CNN will be described below, the present invention is not limited thereto. A model to be applied to existing machine learning such as a deep CNN (DCNN), a decision tree, hierarchical Bayes, or a support vector machine (SVM) may be used as the learning model.

The learning unit 632 inputs the learning data in the learning dataset to the learning model. The learning unit 632 adjusts parameters of a learning model using a method such as an error backpropagation method such that the output of the learning model obtained by inputting the learning data (an effect prediction value) approaches the training data (an effect performance value) corresponding to the learning data. The learning unit 632 trains the learning model in supervised learning by adjusting the parameters of the learning model such that the output of the learning model obtained by inputting the learning data for each of the provided learning datasets approaches the training data. The learning unit 632 causes the training of the learning model to be terminated when it is determined that a predetermined termination condition is satisfied. The predetermined termination condition is, for example, a condition that the number of times of learning has reached a predetermined number or that an error in the prediction value has become less than or equal to a predetermined threshold value or the like. The learning unit 632 designates the learning model when the learning is terminated as a prediction model. The learning unit 632 causes the prediction model information 625 to store the parameters set in the learning model (the prediction model) when the learning is terminated. The parameter here is a variable when the prediction model is generated, and is, for example, information indicating the number of units in each layer of a CNN input layer, an intermediate layer, and an output layer, the number of hidden layers, an activation function, and the like or information indicating coupling coefficients and weights for coupling nodes in each hierarchy.

The device control unit 633 generally controls the learning device 60. The device control unit 633 causes the storage unit 62 to store information such as, for example, the state information 620, acquired via the communication unit 61. Also, the device control unit 633 transmits information about the prediction model generated by the learning unit 632 to the prediction device 70 via the communication unit 61.

Figures 3, 4:
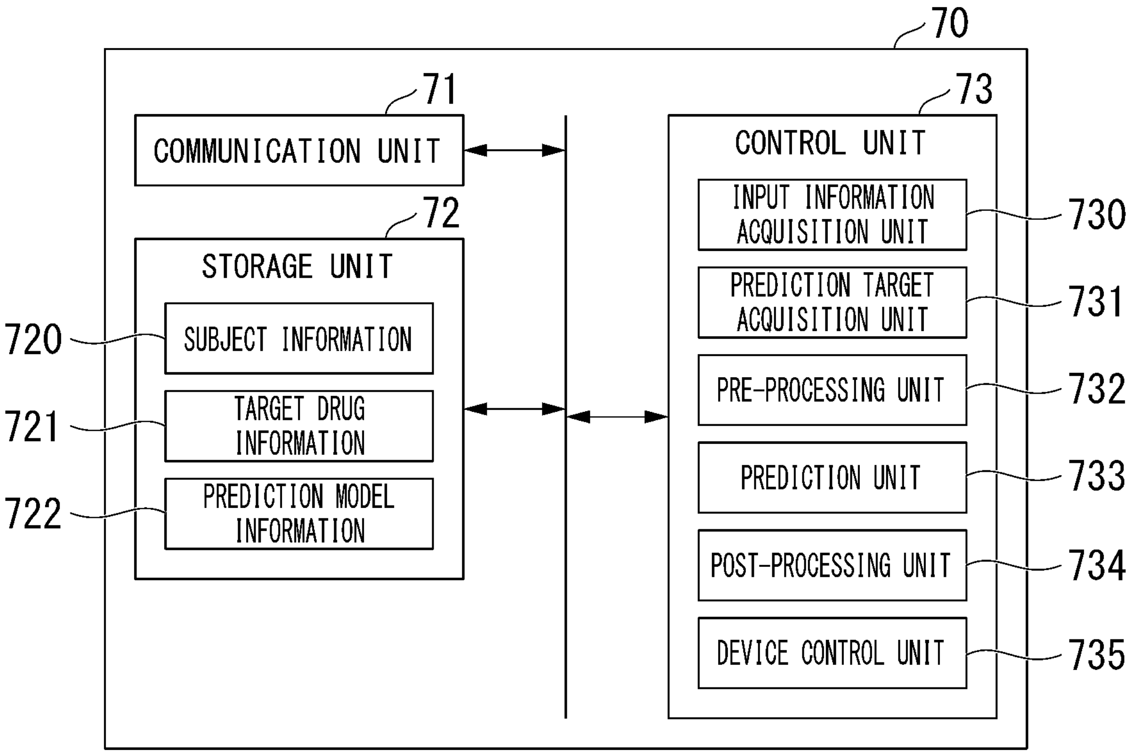
FIG. 3 is a block diagram showing an example of a configuration of a prediction device 70 according to an embodiment of the present invention.
FIG. 4 is a diagram showing an example of a configuration of state information 620 according to an embodiment of the present invention.

FIG. 3 is a block diagram showing an example of a configuration of the prediction device 70 according to the present embodiment. The prediction device 70 includes, for example, a communication unit 71, a storage unit 72, and a control unit 73. The communication unit 71 communicates with an external device. The external device here is the learning device 60.

The storage unit 72 includes an HDD, a flash memory, an EEPROM, a RAM, a ROM, or any combination of these storage media. The storage unit 72 stores, for example, a subject information 720, a target drug information 721, and a prediction model information 722.

The subject information 720 is information of a subject serving as a prediction target to be predicted using the prediction model. The subject information 720 is, for example, information corresponding to the state information 620 and the omics information 621 in the subject. The subject information 720 includes information about patients transmitted from the patient information DB 30 to the evaluation device 50. Alternatively, the subject information 720 may include information about the subject input from an input unit (not shown) of the prediction device 70 via the input device such as a keyboard.

The target drug information 721 is information of the anticancer agent (the target drug) that is the prediction target to be predicted using the prediction model. The target drug information 721 is, for example, information corresponding to the drug information 622 in anticancer agents that may be administered to the subject. The target drug information 721 includes information about the patient transmitted from the drug information DB 40 to the evaluation device 50. Alternatively, the target drug information 721 may include information about target drugs input from the input unit of the prediction device 70 via an input device such as a keyboard.

The prediction model information 722 is information indicating the prediction model generated by the learning device 60 and is information similar to the prediction model information 625.

The control unit 73 is implemented, for example, by causing a CPU provided as hardware in the prediction device 70 to execute a program stored in the storage unit 72. The control unit 73 includes, for example, an input information acquisition unit 730, a prediction target acquisition unit 731, a pre-processing unit 732, a prediction unit 733, a post-processing unit 734, and a device control unit 735.

As described above, the prediction device 70 makes a prediction related to therapy with an anticancer agent using a prediction model. Specifically, the control unit 73 makes a prediction with the following prediction targets (1) to (7) serving as prediction targets for which prediction is to be carried out.

(1) Degree of anticancer effect when an anticancer agent has been administered to cancer cells of the subject (2) Possibility that the cancer cells of the subject will acquire resistance to the administered anticancer agent
(3) Degree of anticancer effect of another anticancer agent when the other anticancer agent has been administered to the cancer cells that have acquired resistance in (2)
(4) Possibility that a target drug will act effectively on the cancer cells
(5) Patients on whom the target drug is likely to act effectively
(6) Type of cancer on which the target drug is likely to act effectively
(7) Degree of anticancer effect of a combination of target drugs Also, in the prediction targets (1) to (6), the drug to be administered to the subject or the target drug may be a combination of multiple drugs instead of a single drug. (7) is used when an effect of the case where a certain drug (including a combination of multiple drugs) is used is compared with an effect of the case where a certain drug and another drug (including a combination of multiple drugs) are combined. Also, the above-described "combination of drugs" includes "a combination of an anticancer agent and an anticancer agent" and "a combination of immune cells and an anticancer agent."

Any one of the prediction targets (1) to (7) serving as the prediction target is decided on, for example, by a user's selection or the like. Specifically, the prediction target acquisition unit 731 of the control unit 73 acquires information indicating a prediction target input from the input unit of the prediction device 70 via the input device such as a keyboard. The control unit 73 makes a prediction using a prediction model by controlling the input information acquisition unit 730, the pre-processing unit 732, the prediction unit 733, and the post-processing unit 734 on the basis of the information indicating the prediction target acquired by the prediction target acquisition unit 731. Methods of predicting each of the prediction targets (1) to (7) will be described below in order.

First, the method of predicting the prediction target (1) will be described.

The input information acquisition unit 730 acquires input information corresponding to the prediction target acquired by the prediction target acquisition unit 731. The input information is information input to the prediction model. The input information acquisition unit 730 acquires the subject information 720 as the input information when the prediction target (1) is the prediction target. The input information acquisition unit 730 outputs the subject information 720, which has been acquired, to the pre-processing unit 732.

The pre-processing unit 732 performs preliminary processing (pre-processing) when a prediction is made using the prediction model. Specifically, when the prediction target (1) is the prediction target, the pre-processing unit 732 generates input data in which information about an anticancer agent capable of being administered to the subject is associated with the subject information 720. The input data is data input to the prediction model when the prediction is made.

The information about the anticancer agent here includes, for example, information of an anticancer agent capable of being administered to the subject and information indicating a dosage and the like. Although information about these anticancer agents may be arbitrarily set, it is preferable that the information about these anticancer agents be similar to the contents learned by the prediction model (anticancer agents and dosages thereof present in the learning data) or be set in a range similar thereto. From this, it is possible to accurately predict the degree of anticancer effect on the basis of the content learned by the prediction model. The pre-processing unit 732 outputs the generated input data to the prediction unit 733.

The prediction unit 733 predicts the prediction target (1) using the prediction model. The prediction unit 733 acquires the prediction model information 722 with reference to the storage unit 72 and constructs the prediction model on the basis of the acquired information. The prediction unit 733 causes the input data generated by the pre-processing unit 732 to be input to the constructed prediction model. The prediction unit 733 acquires an output obtained from the prediction model by inputting the input data to the prediction model. The information output from the prediction model here is information indicating the degree of anticancer effect when the anticancer agent indicated in the input data has been administered to the cancer cells of the subject under input conditions indicated in the input data. The input conditions here are, for example, conditions designated by a cancer state in the subject designated in the subject information 720, omics information of the cancer cells of the subject, and drug information of an anticancer agent whose administration is being considered and a dosage set by the pre-processing unit 732. The prediction unit 733 outputs information output from the prediction model to the post-processing unit 734.

The post-processing unit 734 generates a prediction result of the prediction target (1) on the basis of information output from the prediction model acquired from the prediction unit 733. For example, when the information indicating the degree of anticancer effect output from the prediction model is greater than or equal to a predetermined threshold value, the post-processing unit 734 generates a prediction result indicating that an anticancer agent will be effective when the anticancer agent indicated in the input data is administered to the cancer cells of the subject. The post-processing unit 734 outputs the generated prediction result to the device control unit 735.

The device control unit 735 collectively controls the prediction device 70. For example, the device control unit 735 causes the storage unit 72 to store information such as the prediction model information 625 acquired via the communication unit 71. Also, for example, the device control unit 735 may cause a display unit (not shown) of the prediction device 70 or the like to display the prediction result generated by the post-processing unit 734.

Next, a method of predicting the prediction target (2) will be described.

Because a flow of a process performed by the input information acquisition unit 730, the pre-processing unit 732, the prediction unit 733, and the post-processing unit 734 is similar to that in the case where the prediction target (1) is predicted, a description thereof will be omitted. Only configurations in the case where the prediction target (2) is predicted differently from those in the case where the prediction target (1) is predicted will be described below.

When the prediction target (2) is predicted, the prediction unit 733 uses a prediction model trained to predict the prediction target (2). Specifically, a prediction model for predicting a possibility that cancer cells in a subject will acquire resistance to an anticancer agent indicated in the input data is used. In this case, for example, when the prediction model is generated, the learning device 60 uses information that includes information indicating performance of whether or not the cancer cells of the subject have acquired resistance to the administered anticancer agent in the drug effectiveness information 624 serving as the training data. The learning device 60 adjusts the parameters of the model such that the output obtained by inputting the learning data to the learning model approaches the training data associated with the learning data, i.e., the performance of whether or not resistance has been acquired. From this, it is possible to generate a prediction model for predicting the possibility that cancer cells of a subject will acquire resistance to the anticancer agent indicated in the input data.

Also, it is determined whether or not the three-dimensional cell structure has acquired resistance to an anticancer agent on the basis of the progress of the three-dimensional cell structure after the anticancer agent is administered to the three-dimensional cell structure. A criterion for determining whether or not the three-dimensional cell structure has acquired resistance to the anticancer agent may match a criterion used by the determination device 20 or may be a criterion different from that used by the determination device 20. For example, when the determination using the determination device 20 is made, the determination device 20 determines whether or not the three-dimensional cell structure has acquired resistance to an anticancer agent on the basis of an imaging result of the imaging device 10. On the other hand, when the determination is made without using the determination device 20, the determination of whether or not the three-dimensional cell structure has acquired resistance to the anticancer agent is made in a process in which the progress of the three-dimensional cell structure to which the anticancer agent has been administered is visually inspected by a human and the like.

Also, the prediction model for predicting the prediction target (2) may be identical to or separate from the prediction model for predicting the prediction target (1). When the prediction model for predicting the prediction target (2) is identical to the prediction model for predicting the prediction target (1), the prediction model becomes a model for predicting a possibility that the anticancer agent indicated in the input data will be effective to the cancer cells of the subject and a possibility that the cancer cells of the subject will acquire resistance to the anticancer agent indicated in the input data.

The prediction unit 733 predicts the prediction target (2) using the prediction model. The output obtained from the prediction model is information indicating a possibility that the cancer cells of the subject will acquire resistance to the anticancer agent indicated in the input data under the input condition indicated in the input data by inputting input data to the prediction model.

The post-processing unit 734 generates the result of predicting the prediction target (2) on the basis of the information output from the prediction model acquired from the prediction unit 733. For example, if the information indicating a possibility that resistance will be acquired output from the prediction model is greater than or equal to a predetermined threshold value, the post-processing unit 734 generates a prediction result indicating that there is a high possibility that the cancer cells of the subject will acquire resistance to the anticancer agent indicated in the input data.

Next, a method of predicting the prediction target (3) will be described.

Because a flow of a process performed by the input information acquisition unit 730, the pre-processing unit 732, the prediction unit 733, and the post-processing unit 734 is similar to that in the case where the prediction target (1) is predicted, description thereof will be omitted. Only configurations in the case where the prediction target (3) is predicted differently from those in the case where the prediction target (1) is predicted will be described below.

When the prediction target (3) is predicted, the prediction unit 733 uses a prediction model trained to predict the prediction target (3). Specifically, a prediction model for predicting a degree of anticancer effect based on another anticancer agent when the other anticancer agent has been administered to the cancer cells that have acquired resistance to a certain anticancer agent is used. In this case, for example, the learning device 60 uses a process in which information indicating whether or not administration is administration after resistance to the certain anticancer agent is acquired is included in the administration performance information 623 serving as the learning data when the prediction model is generated. The learning device 60 adjusts the parameters of the model such that the output obtained by inputting the learning data to the learning model approaches the training data associated with the learning data, i.e., the performance of whether or not administration has been effective after resistance was acquired. From this, it is possible to generate a prediction model for predicting a degree of an anticancer effect acting on the cancer cells after the resistance is acquired.

The prediction unit 733 predicts the prediction target (3) using the prediction model. The output obtained from the prediction model by inputting input data to the prediction model is information indicating a degree to which the anticancer agent indicated in the input data is effective when the anticancer agent has been administered after the cancer cells of the subject acquired resistance under the input condition indicated in the input data.

The post-processing unit 734 generates a result of predicting the prediction target (3) on the basis of the information output from the prediction model acquired from the prediction unit 733. For example, the post-processing unit 734 generates a prediction result indicating a high possibility that the anticancer agent indicated in the input data will be effective when the anticancer agent has been administered after the cancer cells of the subject acquired resistance when the information indicating a degree of anticancer effect due to the administration after the acquisition of resistance output from the prediction model is greater than or equal to a predetermined threshold value.

Next, a method of predicting the prediction target (4) will be described. Only configurations in the case where the prediction target (4) is predicted differently from those in the case where the prediction target (1) is predicted will be described below.

The input information acquisition unit 730 acquires target drug information 721 as input information when the prediction target (4) is the prediction target. The input information acquisition unit 730 outputs the target drug information 721, which has been acquired, to the pre-processing unit 732.

When the prediction target (4) is the prediction target, the pre-processing unit 732 generates input data in which information about a patient to whom an anticancer agent corresponding to the target drug information 721 may be administered to is associated. The information about the patient here is, for example, information corresponding to the state information indicating the cancer state and the like in the patient and the omics information such as genetic information of cancer cells of the patient.

The prediction unit 733 predicts the prediction target (4) using the prediction model. The prediction unit 733 acquires an output obtained from the prediction model by inputting input data to the prediction model. Here, the information output from the prediction model is information indicating a degree of anticancer effect when the anticancer agent serving as a target has been administered to a patient who matches the input condition indicated in the input data, under the input condition indicated in the input data.

The post-processing unit 734 generates a result of predicting the prediction target (4) on the basis of the information output from the prediction model acquired from the prediction unit 733. For example, when the information indicating the degree of anticancer effect output from the prediction model is greater than or equal to a predetermined threshold value, the post-processing unit 734 generates a prediction result indicating that the anticancer agent serving as the target will be effective to the cancer cells.

Next, a method of predicting the prediction target (5) will be described. Because a flow of a process performed by the input information acquisition unit 730, the pre-processing unit 732, the prediction unit 733, and the post-processing unit 734 is similar to that in the case where the prediction target (4) is predicted, description thereof will be omitted. Only configurations in the case where the prediction target (5) is predicted differently from those in the case where the prediction target (4) is predicted will be described below.

The post-processing unit 734 generates a result of predicting the prediction target (5) on the basis of information output from the prediction model acquired from the prediction unit 733. For example, the post-processing unit 734 aggregates the information indicating the degree of anticancer effect output from the prediction model for each cancer state of the patient. For example, when the degree of anticancer effect in a group of patients whose cancer states may be considered to be equivalent is greater than or equal to a predetermined threshold value, the post-processing unit 734 generates a prediction result indicating that the anticancer agent will be effective to the patients in the cancer state. In other words, patients for whom the anticancer agent is likely to be effective are predicted.

Next, a method of predicting the prediction target (6) will be described. Because a flow of a process performed by the input information acquisition unit 730, the pre-processing unit 732, the prediction unit 733, and the post-processing unit 734 is similar to that in the case where the prediction target (4) is predicted, description thereof will be omitted. Only configurations in the case where the prediction target (6) is predicted differently from those in the case where the prediction target (4) is predicted will be described below.

The post-processing unit 734 generates a result of predicting the prediction target (6) on the basis of the information output from the prediction model acquired from the prediction unit 733. For example, the post-processing unit 734 aggregates information indicating the degree of anticancer effect output from the prediction model for each type of cancer. For example, when the degree of anticancer effect in the same type of cancer is greater than or equal to a predetermined threshold, the post-processing unit 734 generates a prediction result indicating that the anticancer agent will be effective for each type of cancer.

Next, a method of predicting the prediction target (7) will be described. Because a flow of a process performed by the input information acquisition unit 730, the pre-processing unit 732, the prediction unit 733, and the post-processing unit 734 is similar to that in the case where the prediction target (4) is predicted, description thereof will be omitted. Only configurations in the case where the prediction target (7) is predicted differently from those in the case where the prediction target (4) is predicted will be described below.

When the prediction target (7) is predicted, the prediction unit 733 uses a prediction model trained to predict the prediction target (7). Specifically, a prediction model for predicting the degree of anticancer effect of a combination of target drugs is used. In this case, for example, when the prediction model is generated, the learning device 60 uses information that includes information indicating the combination of administered anticancer agents in the administration performance information 623 serving as learning data. The learning device 60 adjusts the parameters of the model such that the output obtained by inputting the learning data to the learning model approaches the training data associated with the learning data, i.e., the performance of whether or not the administration of a combination of anticancer agents is effective. From this, it is possible to generate a prediction model for predicting a degree of anticancer effect of a combination of target drugs.

The prediction unit 733 predicts the prediction target (7) using the prediction model. The output obtained from the prediction model by inputting input data to the prediction model is information indicating the degree of anticancer effect when a combination of target drugs is administered under the input conditions indicated in the input data.

The post-processing unit 734 generates a result of predicting the prediction target (7) on the basis of the information output from the prediction model acquired from the prediction unit 733. For example, when the information indicating the degree of anticancer effect output from the prediction model is greater than or equal to a predetermined threshold value, the post-processing unit 734 generates a prediction result indicating that the anticancer effect will be high when the target drugs have been administered in combination.

FIG. 4 is a diagram showing an example of a configuration of the state information 620 according to the present embodiment. The state information 620 is generated for each subject. The state information 620 includes, for example, items such as a subject ID and the state information. A subject ID is information for uniquely identifying the subject. The state information includes, for example, items such as a stage, an age, a type of cancer, a therapy history, and pathological findings. The stage is a cancer stage of the subject identified by the subject ID. The age is an age of the subject. The type of cancer is a type of cancer of the subject. The therapy history is the subject's history of cancer therapy. The pathological findings are pathological findings such as test results and diagnostic results of the subject. Examples of the pathological findings include blood test results, urine test results, interview results, and the like. The pathological findings are findings such as results of producing specimens from organs and tissues collected from a subject and performing examinations and diagnoses. The pathological findings include, for example, cell atypia and pleomorphism in specimens, the presence or absence and morphology of luminal structures, and the presence or absence of cell infiltration into stromal tissues.

FIG. 5 is a diagram showing an example of a configuration of the omics information 621 according to the present embodiment. The omics information 621 is generated for each subject. The omics information 621 is acquired, for example, by performing genetic analysis of cells such as blood collected from a subject. The omics information 621 includes, for example, items such as a subject ID and omics information. The subject ID is information for uniquely identifying the subject. The omics information includes, for example, items such as genomics, transcriptomics, metabolomics, proteomics, and the presence or absence of methylation. The genomics is genetic information of a subject. The transcriptomics is genetic information for each tissue and each cell of the subject. The metabolomics is metabolite information of the subject. The proteomics is information about proteins of the subject. Phenomics is information indicating a phenotype in the subject. The presence or absence of methylation is information indicating the presence or absence of DNA methylation in the cancer cells of the subject.

FIG. 6 is a diagram showing an example of a configuration of the drug information 622 according to the present embodiment. The drug information 622 is generated for each anticancer agent. The drug information 622 includes, for example, a drug ID and drug information. The drug ID is information for uniquely identifying the anticancer agent. The drug information includes, for example, items such as structural formula information, pharmacological information, and physical properties information. The structural formula information is information indicating the structural formula of the anticancer agent designated by the drug ID. The pharmacological information is information indicating a physiological change caused by the anticancer agent. The physical properties information is information indicating the physical properties of the anticancer agent.

FIG. 7 is a diagram showing an example of a configuration of a drug information 622A according to the present embodiment. The drug information 622A is a modified example of the drug information 622 and is generated for each combination, for example, when multiple anticancer agents are administered in combination. The drug information 622A includes, for example, a drug combination ID and drug combination information. The drug combination information is information indicating a combination of anticancer agents designated by the drug combination ID and includes items such as, for example, a drug ID of combination 1 that is a first anticancer agent and a drug ID of combination 2 that is a second anticancer agent.

FIG. 8 is a diagram showing an example of a configuration of the administration performance information 623 according to the present embodiment. The administration performance information 623 is generated for each subject. The administration performance information 623 includes items such as, for example, a subject ID, an administration performance information 1, an administration performance information 2, and the like. The subject ID is information for uniquely identifying the subject. The administration performance information 1, the administration performance information 2, and the like are information indicating an administration history of an anticancer agent administered to the subject designated by the subject ID. The administration performance information includes, for example, items such as a drug ID, a dosage, and resistance. The drug ID is information for uniquely identifying an anticancer agent administered to the cancer cells of the subject. The dosage is an amount of anticancer agent administered to the cancer cells of the subject and the resistance is information about the resistance of the cancer cells of the subject at the time of administration of the anticancer agent. The resistance includes, for example, items such as the presence or absence, an anticancer agent name, an administration timing, and the like. The presence or absence is information indicating the presence or absence of resistance. The anticancer agent name is the name of the anticancer agent with resistance. The administration timing is information indicating whether the administration is administration after acquisition of the resistance or whether the administration is administration before acquisition of the resistance.

FIG. 9 is a diagram showing an example of a configuration of the drug effectiveness information 624 according to the present embodiment. The drug effectiveness information 624 is generated for each subject. Also, for example, the drug effectiveness information 624 is generated in correspondence with administration performance indicated in the administration performance information 623. The drug effectiveness information 624 includes, for example, items such as a subject ID, drug effectiveness information 1 and 2, and the like. The subject ID is information for uniquely identifying a subject. The drug effectiveness information 1 and 2 and the like is information indicating a history of an effect of the anticancer agent administered to the subject identified by the subject ID. The drug effectiveness information includes, for example, items such as administration performance information, an effectiveness level, the presence or absence of resistance acquisition, and the like. The administration performance information is information indicating the anticancer agent administered to the subject and is, for example, information designated in administration performance information 1, administration performance information 2, and the like of the administration performance information 623. The effectiveness level is information indicating the degree of effectiveness when the anticancer agent is effective. The effectiveness level may be binary information indicating whether or not the anticancer agent is effective or may be information indicating the degree of effectiveness of the anticancer agent in multiple stages. The presence or absence of the resistance acquisition is information indicating whether or not the cancer cells of the subject have acquired resistance to the anticancer agent.

Figure 10:
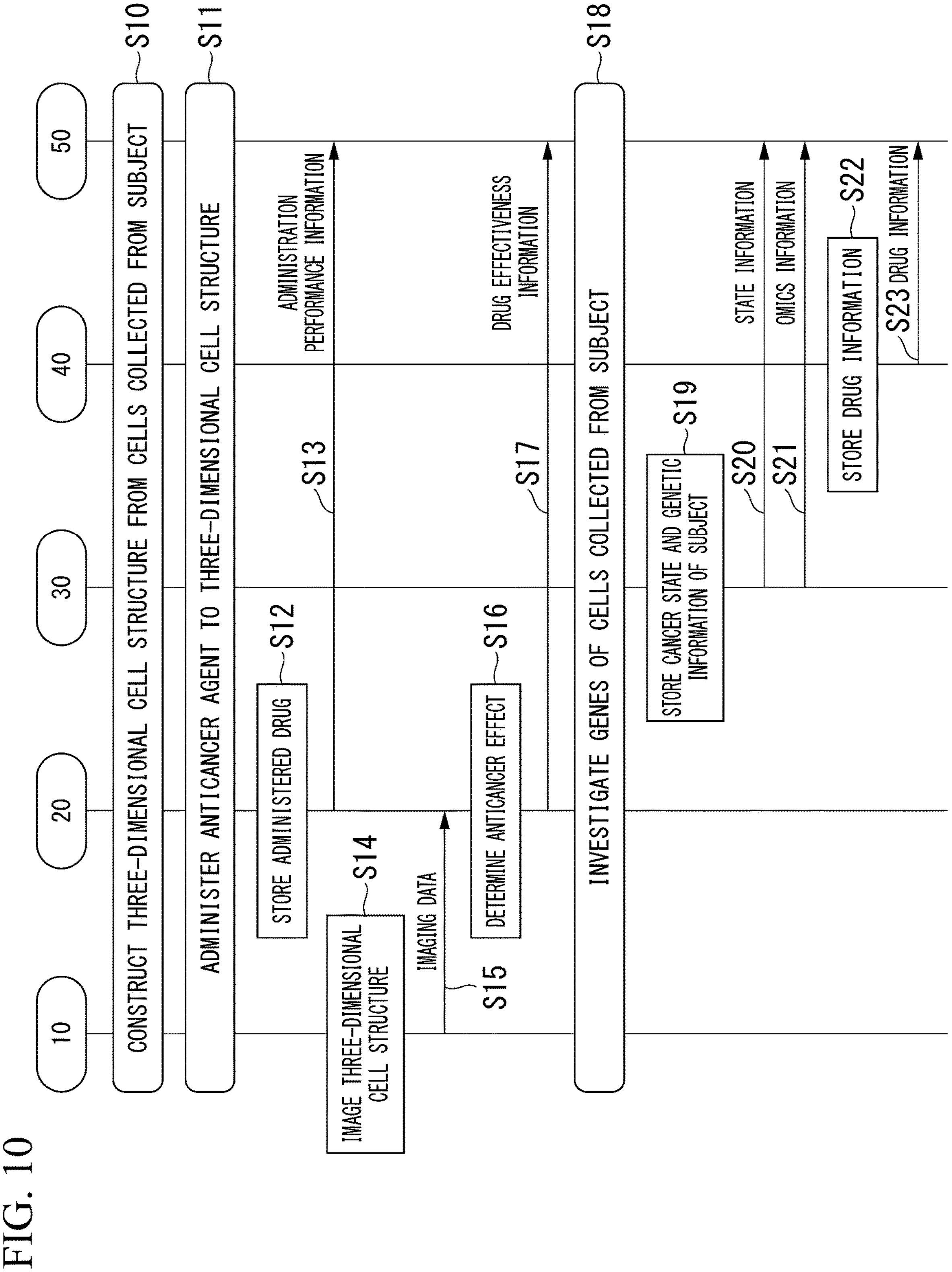
FIG. 10 is a sequence chart showing a flow of a process performed by the anticancer agent effect evaluation device 1 according to an embodiment of the present invention.

FIG. 10 is a sequence chart showing a flow of a process performed by the anticancer agent effect evaluation device 1 according to the present embodiment. In FIG. 10, the flow of the process of acquiring learning information for training a learning model in the learning stage is shown.

A three-dimensional cell structure is constructed from cells collected from a subject (step S10). Specifically, the three-dimensional cell structure including cells constituting a stroma and cancer cells collected from the subject is constructed. An anticancer agent is administered to the three-dimensional cell structure (step S11). Specifically, the three-dimensional cell structure is cultured in the presence of the anticancer agent. Information about the anticancer agent administered to the three-dimensional cell structure is input to the determination device 20 via the input device such as a keyboard.

The determination device 20 stores information about the anticancer agent administered to the three-dimensional cell structure (step S12) and notifies the evaluation device 50 of the information about the anticancer agent administered to the three-dimensional cell structure (step S13). Information about the anticancer agent administered to the three-dimensional cell structure is stored as the administration performance information 623 in the storage unit 62 of the learning device 60.

The imaging device 10 images the three-dimensional cell structure (step S14). The imaging device 10 images the three-dimensional cell structure, for example, before the anticancer agent is administered to the three-dimensional cell structure and at predetermined time intervals (for example, every day) after the anticancer agent is administered. The imaging device 10 outputs images of the imaged three-dimensional cell structure to the determination device 20 (step S15).

The determination device 20 determines an anticancer effect on the basis of the images of the three-dimensional cell structure acquired from the imaging device 10 (step S16). In this case, the determination device 20 may determine whether or not the cancer cells of the subject have acquired resistance to the anticancer agent. For example, the determination device 20 determines whether or not a drug identical to a current determination target drug had been administered to the subject in the past with reference to the administration performance information 623 of the subject. The determination device 20 determines that the cancer cells of the subject have acquired resistance to the anticancer agent if a result of determining the current anticancer effect indicates "ineffective" when it is determined that there is a drug administered to the subject in the past and that there is an anticancer effect with respect to the drug. On the other hand, the determination device 20 determines that the cancer cells of the subject have not acquired resistance to the anticancer agent when it is determined that the drug administered to the subject in the past has an anticancer effect and a result of determining the current anticancer effect also indicates "effective." The determination device 20 notifies the evaluation device 50 of the determination result (step S17). The determination result is stored as the drug effectiveness information 624 in the storage unit 62 of the learning device 60.

On the other hand, the subject's genes and the like are investigated from the cells (blood) collected from the subject (step S18). Investigation results related to the subject's genes and the like are input to the patient information DB 30 via the input device such as a keyboard.

The patient information DB 30 stores the investigation results related to the subject's genes and the like (step S19) and notifies the evaluation device 50 of information indicating the investigation results (steps S20 and S21). Information indicating the cancer state such as the stage and age of the subject within information indicating the investigation results related to the subject's genes and the like is stored as the state information 620 in the storage unit 62 of the learning device 60. Also, information indicating investigation results such as cancer cell genes of the subject is stored as the omics information 621 in the storage unit 62 of the learning device 60.

On the other hand, information about an anticancer agent is input to the drug information DB 40 via the input device such as a keyboard and stored in the drug information DB 40 (step S22). The drug information DB 40 notifies the evaluation device 50 of the information about the anticancer agent (step S23). The information about the anticancer agent is stored as the drug information 622 in the storage unit 62 of the learning device 60.

Figure 11:
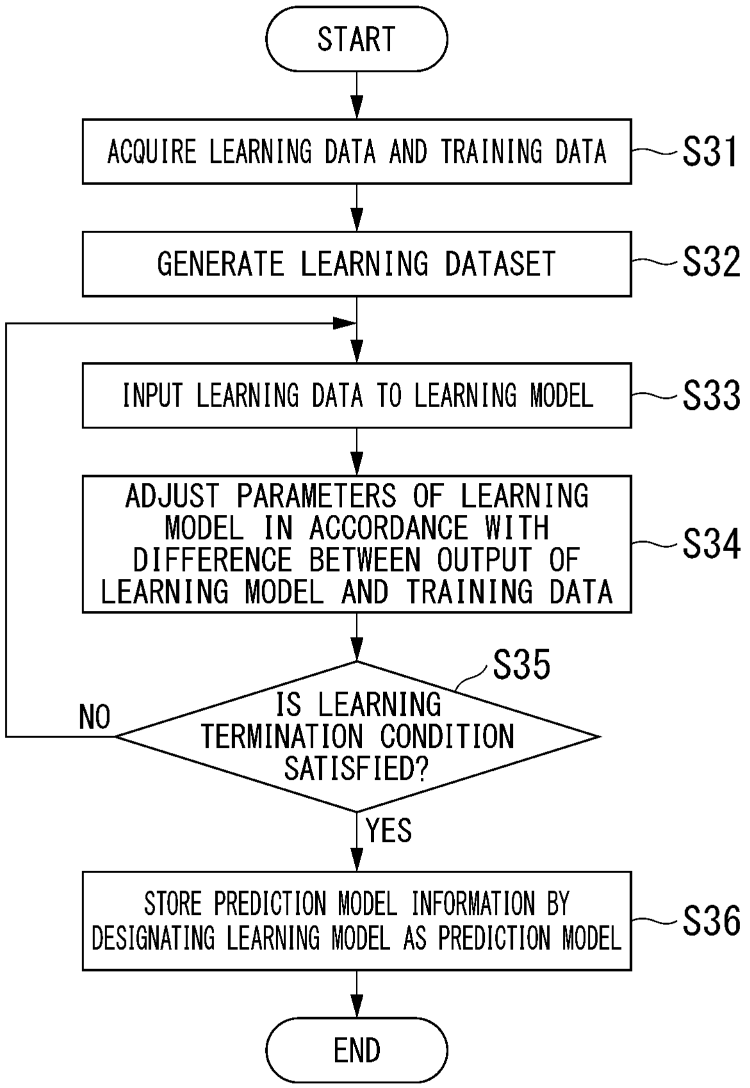
FIG. 11 is a flowchart showing a flow of a process performed by the learning device 60 according to an embodiment of the present invention.

FIG. 11 is a flowchart showing a flow of a process performed by the learning device 60 of the present embodiment. In FIG. 11, the flow of the process in which the learning device 60 creates a prediction model is shown. The learning device 60 acquires learning data and training data (step S31). Specifically, the learning device 60 acquires condition information 620, omics information 621, administration performance information 623, and drug information 622 in a subject as the learning data. The learning device 60 acquires drug effectiveness information 624 for the subject as the training data.

The evaluation device 50 generates a learning dataset by combining the learning data and the training data (step S32). The learning device 60 inputs the learning data in the learning dataset to the learning model (step S33). The learning device 60 adjusts parameters of the learning model such that a difference between an output obtained from the learning model and the training data in the dataset becomes small (step S34). The learning device 60 determines whether or not a predetermined learning termination condition is satisfied (step S35). When the learning termination condition is satisfied, the learning device 60 causes the learning model at that time to be established as a prediction model and causes the parameter values and the like set in the model to be stored as prediction model information 625. On the other hand, when the learning termination condition is not satisfied in step S35, the learning device 60 returns to step S33 and iterates learning.

Figure 12:
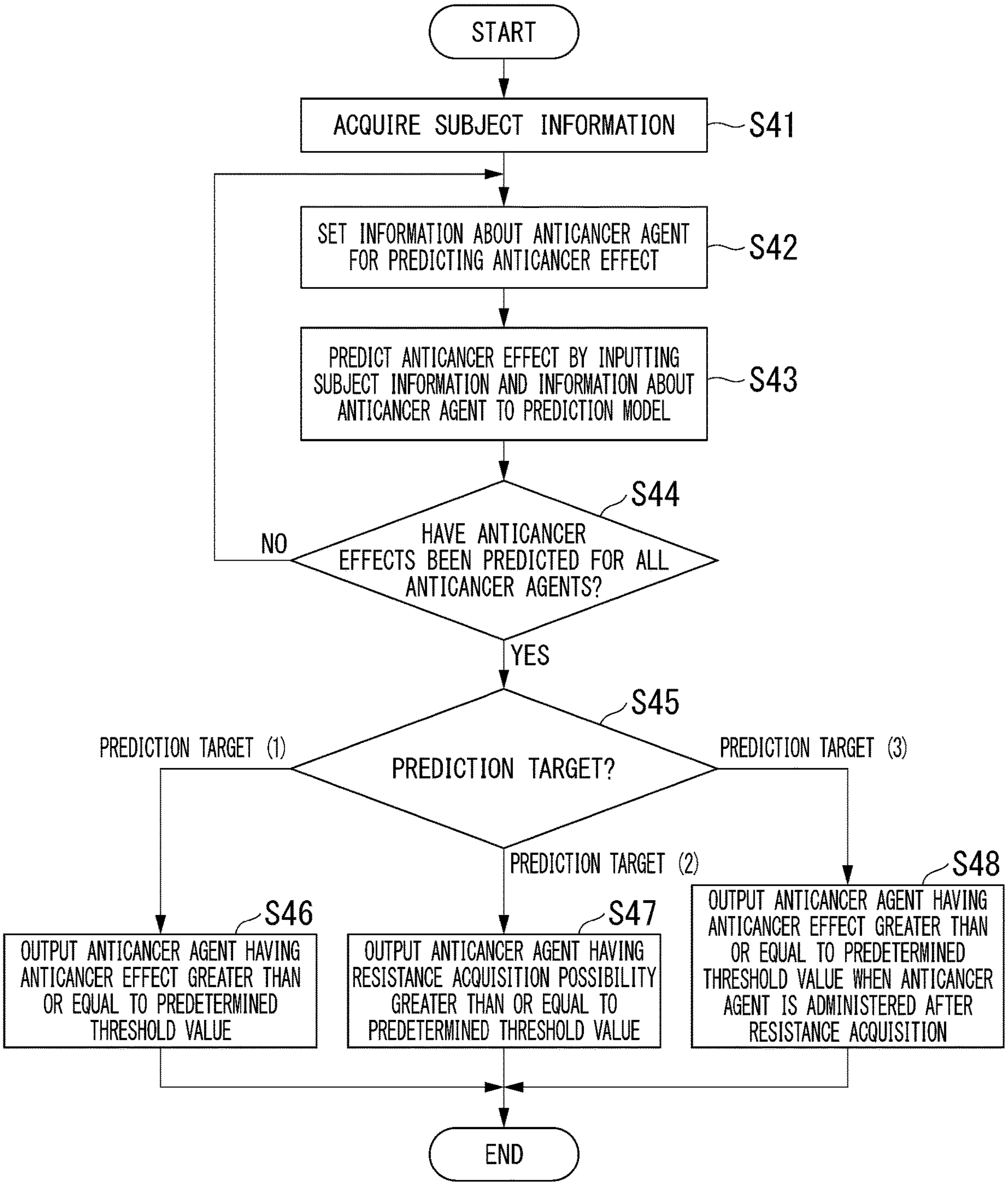
FIG. 12 is a flowchart showing a flow of a process performed by the prediction device 70 according to an embodiment of the present invention.
Figure 13:
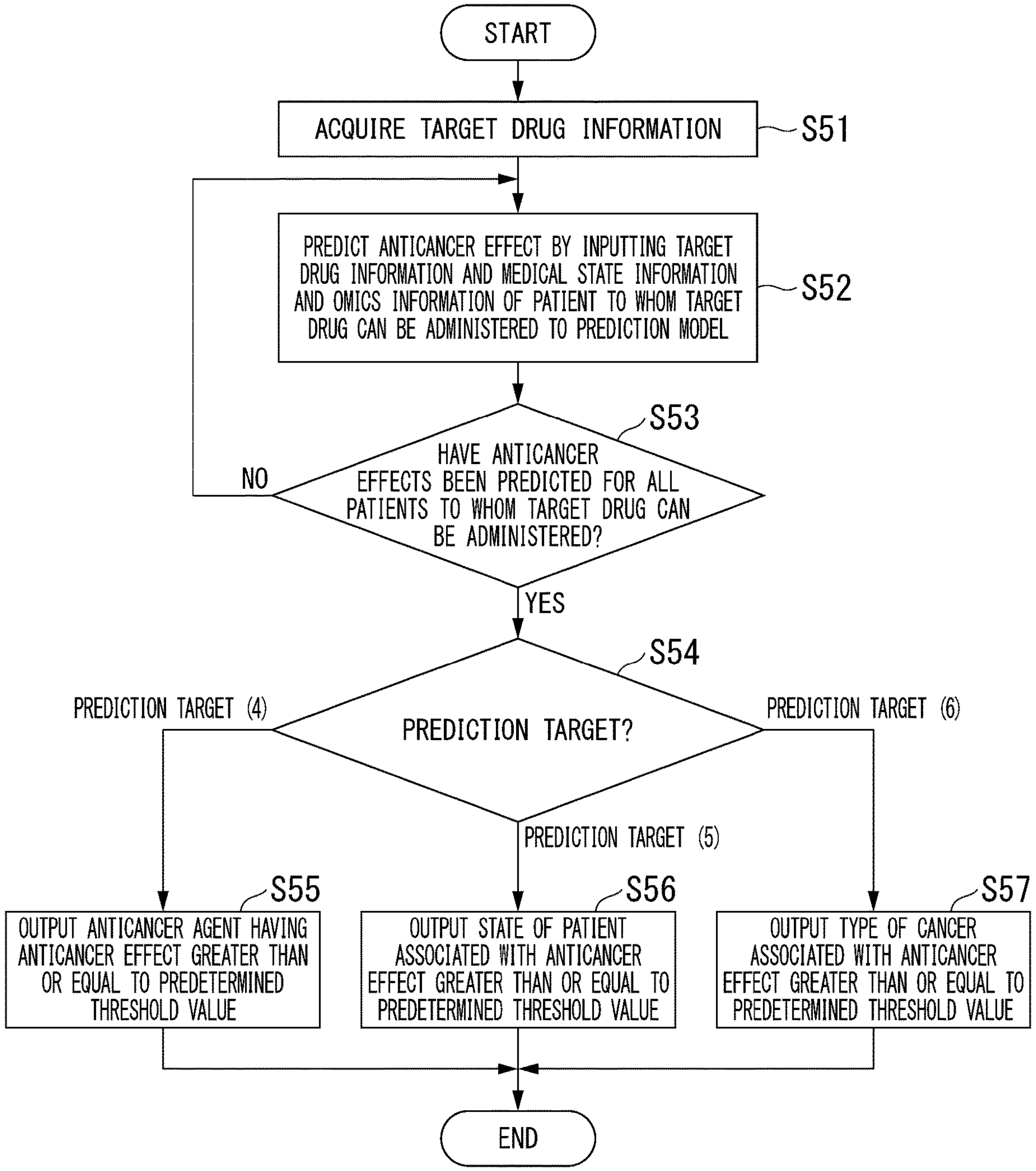
FIG. 13 is a flowchart showing a flow of a process performed by the prediction device 70 according to an embodiment of the present invention.
Figure 14:
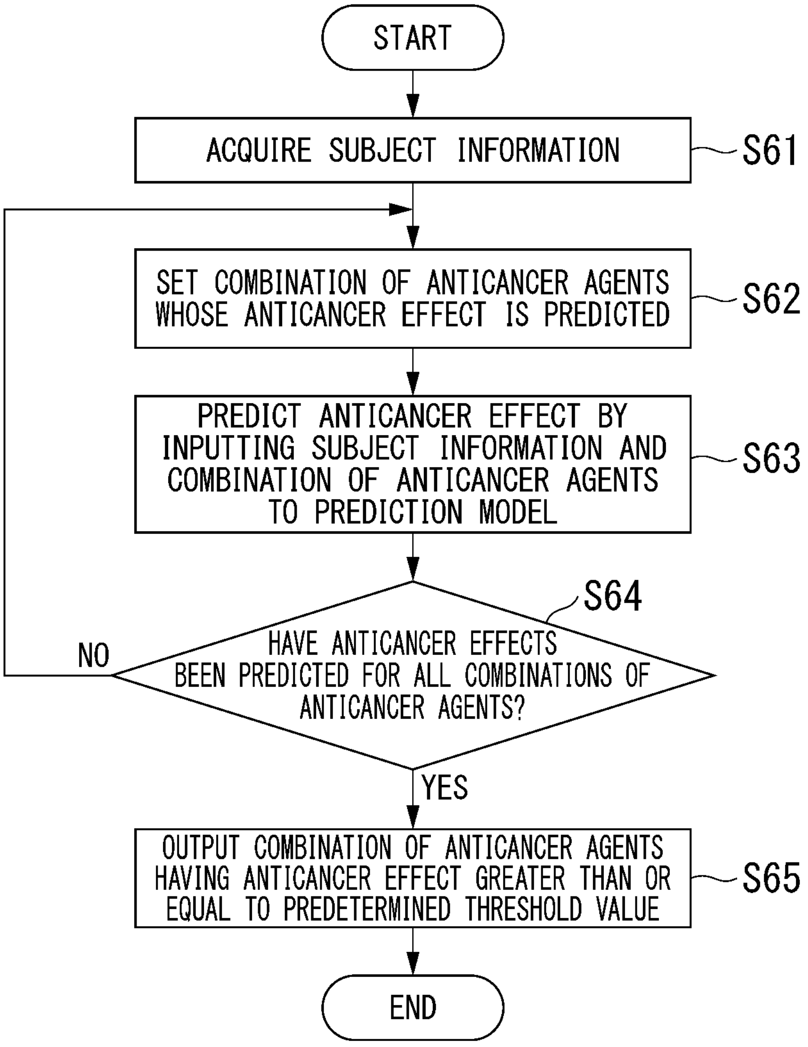
FIG. 14 is a flowchart showing a flow of a process performed by the prediction device 70 according to an embodiment of the present invention.

FIGS. 12 to 14 are flowcharts showing a flow of a process performed by the prediction device 70 of the present embodiment. In FIG. 12, the flow of the process in which the prediction device 70 predicts one of the prediction targets (1) to (3) is shown. In the flowchart of FIG. 12, it is assumed that a prediction model for predicting any one of the prediction targets (1) to (3) is already created by the learning device 60 and information indicating the prediction model (prediction model information 722) is stored in the prediction device 70.

The prediction device 70 acquires the subject information 720 of a subject as input information (step S41). The prediction device 70 sets information about the anticancer agent whose anticancer effect is predicted in association with the input information (step S42). The information about the anticancer agent here is, for example, information indicating drug information, a dosage, an administration timing, and the like of the anticancer agent. The administration timing is information indicating whether the administration is administration before acquisition of the resistance or whether the administration is administration after acquisition of the resistance.

The prediction device 70 causes the subject information 720 acquired in step S41 and the information about the anticancer agent set in step S42 to be input to the prediction model and predicts the anticancer effect in the set anticancer agent from the obtained output (step S43).

The prediction device 70 determines whether or not the anticancer effects have been predicted for all anticancer agents whose anticancer effects are desired to be predicted (step S44). When there is an anticancer agent whose anticancer effect has not yet been predicted, the prediction device 70 returns to step S42 and makes the prediction.

When the anticancer effects of all anticancer agents have been predicted in step S44, the prediction device 70 determines which of the prediction targets (1) to (3) is the prediction target (step S45), generates a prediction result according to the prediction target, and outputs the generated result.

When the prediction target is the prediction target (1), the prediction device 70 outputs a prediction result indicating that an anticancer agent having an anticancer effect greater than or equal to a predetermined threshold value is an anticancer agent effective against cancer cells of the subject (step S46).

When the prediction target is the prediction target (2), the prediction device 70 outputs a prediction result indicating that an anticancer agent having a possibility that the cancer cells will acquire resistance greater than or equal to a predetermined threshold value is an anticancer agent having a high possibility that the cancer cells of the subject will acquire resistance (step S47).

When the prediction target is the prediction target (3), the prediction device 70 outputs a prediction result indicating that an anticancer agent whose anticancer effect in administration after the acquisition of the resistance is greater than or equal to a predetermined threshold value is an anticancer agent effective at the time of administration after the cancer cells of the subject acquire resistance (step S48).

In FIG. 13, a flow of a process in which the prediction device 70 predicts any one of the prediction targets (4) to (6) is shown. Here, it is assumed that a prediction model for predicting any one of the prediction targets (4) to (6) is already created by the learning device 60 and information indicating the prediction model (the prediction model information 722) is stored in the prediction device 70.

The prediction device 70 acquires the target drug information 721 as the input information (step S51). The prediction device 70 sets information about a patient to whom the anticancer agent is administered in association with the input information (step S52). The information about the patient here is, for example, information that is state information, omics information, and the like of the patient.

The prediction device 70 causes the target drug information 721 acquired in step S51 and the information about the patient set in step S52 to be input to the prediction model and predicts the anticancer effect of the anticancer agent corresponding to the target drug information 721 from the obtained output (step S53).

The prediction device 70 determines whether or not the anticancer effects have been predicted for all anticancer agents whose anticancer effects are desired to be predicted (step S54). When there is an anticancer agent whose anticancer effect has not yet been predicted, the prediction device 70 returns to step S52 and makes the prediction.

When the prediction target is the prediction target (4), the prediction device 70 outputs a prediction result indicating that an anticancer agent having an anticancer effect greater than or equal to a predetermined threshold value is an anticancer agent effective against cancer cells (step S55).

When the prediction target is the prediction target (5), the prediction device 70 aggregates anticancer effects for each state of the patient and outputs a prediction result for each state of the patient that indicates an anticancer agent, that will be effective at the time of administration of the anticancer agent, whose anticancer effect is greater than or equal to a predetermined threshold value in the case of administration to a group of patients whose cancer states are equivalent (step S56).

When the prediction target is the prediction target (6), the prediction device 70 aggregates anticancer effects for each type of cancer and outputs a prediction result for each type of cancer that indicates an anticancer agent, that will be effective at the time of administration of the anticancer agent, whose anticancer effect is greater than or equal to a predetermined threshold value in the case of administration to a group of patients whose types of cancer are identical (step S57).

In FIG. 14, a flow of a process in which the prediction device 70 predicts the prediction target (7) is shown. Here, it is assumed that a prediction model for predicting any one of the prediction targets (7) is created by the learning device 60 and information indicating the prediction model (the prediction model information 722) is stored in the prediction device 70.

The prediction device 70 acquires the subject information 720 of the subject as input information (step S61). The prediction device 70 sets information about a combination of anticancer agents whose anticancer effect is predicted in association with the input information (step S62).

The prediction device 70 causes the subject information 720 acquired in step S61 and the information about the combination of anticancer agents set in step S62 to be input to the prediction model and predicts the anticancer effect of the set combination of anticancer agents from the obtained output (step S63).

The prediction device 70 determines whether or not the anticancer effects have been predicted for all combinations of anticancer agents whose anticancer effects are desired to be predicted (step S64). When there is a combination of anticancer agents whose anticancer effects have not yet been predicted, the prediction device 70 returns to step S62 and makes a prediction.

When anticancer effects have been predicted with respect to all combinations of anticancer agents whose anticancer effects are desired to be predicted in step S64, the prediction device 70 outputs a prediction result indicating that a combination of anticancer agents having an anticancer effect greater than or equal to a predetermined threshold value is effective against the cancer cells of the subject when the combination is administered (step S65).

As described above, the evaluation device 50 of the embodiment is an evaluation device for evaluating anticancer effects and includes the learning information acquisition unit 630, the learning unit 632, the storage unit 72, the input information acquisition unit 730, and the prediction unit 733. The learning information acquisition unit 630 acquires learning data and training data. The learning data is information about cancer in an unspecified subject and includes at least the state information 620. The training data is information about the effect of an anticancer agent obtained by administering the anticancer agent to cells collected from the subject. The learning unit 632 generates a prediction model. The prediction model is a model for making a prediction related to therapy using an anticancer agent. The learning unit 632 generates the prediction model by causing the learning model to perform supervised learning for a corresponding relationship between the learning data and the training data acquired by the learning information acquisition unit 630. The storage unit 72 stores the prediction model generated by the learning unit 632. The input information acquisition unit 730 acquires input information. The input information is information about cancer in the subject serving as the prediction target. The prediction unit 733 makes the prediction related to the therapy using the anticancer agent using the input information and the prediction model. The learning information acquisition unit 630 acquires information about the anticancer effect obtained by administering the anticancer agent to the three-dimensional cell structure as the training data. The three-dimensional cell structure is a structure containing cancer cells collected from the unspecified subject and cells constituting a stroma.

From this, it is possible for the evaluation device 50 of the embodiment to designate the state information 620 of the subject as the learning data and it is possible to generate a prediction model for predicting the anticancer effect in consideration of the cancer state of the subject. Therefore, it is possible to evaluate the efficacy of an anticancer agent in consideration of not only cell omics information but also cancer state information, which is various information about a patient.

Also, the evaluation device 50 of the present embodiment is able to generate a prediction model obtained by learning an evaluation result of evaluating an anticancer effect in an environment closer to that of the living body because information about the anticancer effect obtained by administering the anticancer agent to the three-dimensional structure is acquired as the training data. Therefore, it is possible to determine the effectiveness of the therapy for a patient more accurately. Also, in the conventional anticancer therapy, only a single type of anticancer agent may be administered to a patient at a given point in time. However, according to the evaluation device 50 of the present embodiment, because a three-dimensional cell structure is used, it is possible to administer different types of anticancer agents to cancer cells collected from the same patient in parallel and it is possible to simultaneously acquire information on anticancer effects. Furthermore, according to the evaluation device 50 of the present embodiment, because a three-dimensional cell tissue is used, it is possible for the cancer cells from which information about anticancer effects are acquired to be identical to the cancer cells from which omics information and the like are acquired. In other words, it is possible to obtain omics information from cancer cells having the same omics information as cancer cells constituting the three-dimensional cell tissue. From this, it is possible to accurately associate omics information with information about anticancer effects. For this reason, it is possible to determine the effectiveness of the therapy for a patient more accurately. Such association of omics information with information about anticancer effects is particularly important in the case where the possibility that resistance will be acquired is predicted and the like. The reason for this is that it is generally known that omics information is likely to change when cancer cells have acquired resistance compared to before the anticancer agent is administered.

Also, in the evaluation device 50 of the embodiment, the cells constituting the stroma in the three-dimensional cell structure may contain fibroblast cells. Also, in the evaluation device 50 of the embodiment, the cells constituting the stroma in the three-dimensional cell structure may further include vascular endothelial cells and may further include a vascular network. From this, it is possible for the evaluation device 50 of the embodiment to generate a prediction model for learning the evaluation result of evaluating the anticancer effect in an environment closer to that of the living body and it is possible to have effects similar to those described above. Also, it is possible to evaluate the anticancer effects of immune cells and anticancer agents in an environment closer to that of the living body using a three-dimensional cell structure with a vascular network.

Also, in the evaluation device 50 of the embodiment, the learning information acquisition unit 630 acquires the subject's state information 620, the omics information 621, the administration performance information 623, and the drug information 622 as the learning data. The learning information acquisition unit 630 acquires the drug effectiveness information 624 as the training data. The learning unit 632 generates a prediction model for predicting the effect of the anticancer agent acting on the cancer cells of the subject on the basis of the cancer state of the subject and the omics information of the cells collected from the subject. From this, it is possible to evaluate the efficacy of the anticancer agent in consideration of various information about the patient and achieve effects similar to those described above.

Also, in the evaluation device 50 of the embodiment, the input information acquisition unit 730 acquires the subject information 720 including the state information of the subject serving as the prediction target and the omics information of the cells collected from the subject as input information. The prediction unit 733 predicts the effect of the anticancer agent acting on cancer cells of the subject. From this, it is possible for the evaluation device 50 of the embodiment to predict an anticancer agent expected to be effective at the time of administration from the cancer state and the omics information of the subject in the step in which no anticancer agent has been administered yet.

Also, in the evaluation device 50 of the embodiment, the input information acquisition unit 730 acquires the target drug information 721 as the input information. The prediction unit 733 predicts the effect of the anticancer agent designated by the target drug information 721 acting on cancer cells. From this, it is possible for the evaluation device 50 of the embodiment to perform so-called new drug screening for extracting an anticancer agent expected to be effective using a result of evaluating the anticancer effect in an environment closer to that of the living body.

Also, in the evaluation device 50 of the embodiment, the input information acquisition unit 730 acquires the target drug information 721 as the input information. The prediction unit 733 predicts the effect of the anticancer agent designated in the target drug information 721 acting on cancer cells for each cancer state in the patient. From this, it is possible for the evaluation device 50 of the embodiment to extract an anticancer agent expected to have individual effects in accordance with the cancer state of the patient.

Also, in the evaluation device 50 of the embodiment, the state information 620 includes information indicating the type of cancer in the subject. The input information acquisition unit 730 acquires the target drug information 721 as the input information. The prediction unit 733 predicts the effect of the anticancer agent designated in the target drug information 721 acting on cancer cells for each type of cancer. From this, in the evaluation device 50 of the embodiment, it is possible to generate a prediction model for predicting the anticancer effect in consideration of the type of cancer and extract an anticancer agent expected to have an individual effect according to a type of cancer.

Also, in the evaluation device 50 of the embodiment, the administration performance information 623 includes information about a combination of multiple anticancer agents administered to the three-dimensional cell structure. The drug effectiveness information 624 includes a result of determining the anticancer effect of a combination of multiple anticancer agents administered to the three-dimensional cell structure. The input information acquisition unit 730 acquires the target drug information 721 corresponding to the combination of multiple anticancer agents serving as a prediction target as the input information. The prediction unit 733 predicts the effect of the combination of anticancer agents designated in the target drug information 721 acting on cancer cells of the subject.

In general, cancer therapy based on drug administration includes a single-drug therapy in which only a single anticancer agent is administered and combination therapy in which multiple anticancer agents are administered simultaneously or sequentially to perform therapy according to a combined effect thereof. It is not realistic to search for a combination suitable for the combination therapy for each patient because of the enormous number of combinations of anticancer agents. Moreover, in some cases, patients of medical cases of similar cancer states are rare. In such cases, the search for a suitable combination for the combination therapy may be even more difficult.

On the other hand, because the evaluation device 50 of the embodiment uses a three-dimensional cell structure, it is possible to predict the anticancer effect in the case where anticancer agents are combined in consideration of the cancer state of the subject. For this reason, it is possible to present a combination of anticancer agents expected to be effective when the combination therapy is performed for the subject to the subject in the step before the administration of the anticancer agent.

Also, in the evaluation device 50 of the embodiment, the drug effectiveness information 624 includes a result of determining whether or not the cancer cells of the subject have acquired resistance to a predetermined anticancer agent. The input information acquisition unit 730 acquires the subject information 720 of the subject as the input information. The prediction unit 733 predicts a degree to which the cancer cells of the subject acquire resistance to a predetermined anticancer agent.

In general, when a drug has been administered to a patient, an affected area does not necessarily disappear completely and cells in the affected area may mutate and acquire resistance to the drug, making the drug ineffective. In particular, when cancer cells are subjected to the therapy by administering an anticancer agent, the cancer cells tend to mutate, which is one of the factors that make the drug administration therapy of cancer difficult. In the medical field, there is a growing need to predict whether resistance will be acquired, but the actual situation is that the prediction method has not been realized. On the other hand, in the evaluation device 50 of the embodiment, it is possible to predict whether or not the cancer cells of the subject will acquire resistance before the anticancer agent is administered.

Also, in the evaluation device 50 of the embodiment, the drug effectiveness information 624 includes a result of determining whether or not the cancer cells of the subject have acquired resistance to a predetermined anticancer agent (a first anticancer agent). The administration performance information 623 includes information indicating whether or not an anticancer agent (a second anticancer agent) different from the specific anticancer agent administered to the cancer cells of the subject has been administered after the cancer cells of the subject acquired resistance to the specific anticancer agent. The input information acquisition unit 730 acquires the subject information 720 of the subject as the input information. The prediction unit 733 predicts the effect of another anticancer agent acting on the cancer cells of the subject after the cancer cells of the subject acquires resistance to a predetermined anticancer agent. From this, it is possible for the evaluation device 50 of the embodiment to predict an anticancer agent expected to be effective at the time of administration after the cancer cells of the subject mutate and the predetermined anticancer agent becomes ineffective. Even if a patient's cancer cells acquire resistance to a given anticancer agent, it is possible to present an anticancer agent expected to be effective.

Also, the learning device 60 of the embodiment includes a learning information acquisition unit 630 and a learning unit 632. From this, it is possible for the learning device 60 of the embodiment to achieve effects similar to those described above.

Also, the prediction device 70 of the embodiment includes an input information acquisition unit 730 and a prediction unit 733. From this, it is possible for the prediction device 70 of the embodiment to achieve effects similar to those described above.

All or some of the evaluation device 50, the learning device 60, and the prediction device 70 according to the above-described embodiment may be configured to be implemented on a computer. In this case, the functions may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a flexible disk, a magneto-optical disc, a ROM, a portable medium such as a compact disc (CD)-ROM, or a storage device such as a hard disk embedded in the computer system. Further, the "computer-readable recording medium" may include a computer-readable recording medium for dynamically retaining the program for a short time period as in a communication line when the program is transmitted via a network such as the Internet or a communication circuit such as a telephone circuit and a computer-readable recording medium for retaining the program for a given time period as in a volatile memory inside the computer system including a server and a client when the program is transmitted. Also, the above-described program may be a program for implementing some of the above-described functions. Further, the above-described program may be a program capable of implementing the above-described function in combination with a program already recorded on the computer system or may be a program implemented using a programmable logic device such as a field programmable gate array (FPGA).

Although embodiments of the present invention have been described above in detail with reference to the drawings, specific configurations are not limited to the embodiments and other designs and the like may also be included without departing from the objective and scope of the present invention.

What is claimed is:

1. An evaluation device for evaluating an anticancer effect, the evaluation device comprising:

at least one processor; and at least one memory including computer program code, where the at least one memory and the computer program code are configured, with the at least one processor, to cause the evaluation device to:

acquire:

learning data that includes state information, which is information about cancer in an unspecified subject and indicates at least a cancer state in the unspecified subject; and training data that is information about an effect of an anticancer agent obtained by administering the anticancer agent to cells collected from the unspecified subject, generate a prediction model for making predictions related to therapy using the anticancer agent by causing a learning model to perform supervised learning for a corresponding relationship between the learning data and the training data acquired by the learning information acquisition unit;

store the prediction model generated by the learning unit;

acquire input information that is information about cancer in a subject serving as a prediction target; and make related predictions to the therapy using the anticancer agent with the input information and the prediction model, wherein the evaluation device acquires the information about the anticancer effect obtained by administering the anticancer agent to a three-dimensional cell structure including cancer cells collected from the unspecified subject and cells constituting a stroma as the training data;

wherein the evaluation device acquires the state information indicating the cancer state in the unspecified subject, omics information of the cells collected from the unspecified subject, drug information about the anticancer agent, and administration performance information about the anticancer agent administered to the three-dimensional cell structure as the learning data, and acquires drug effectiveness information that is a result of determining whether or not the anticancer agent administered to the three-dimensional cell structure is effective as the training data;

wherein the evaluation device generates the prediction model for predicting an effect of the anticancer agent acting on cancer cells of the cancer patient on the basis of the state information in the cancer patient and the omics information of the cells collected from the cancer patient;

wherein the drug effectiveness information includes a result of determining whether or not the cancer cells of the unspecified subject have acquired resistance to a predetermined first anticancer agent;

wherein the administration performance information includes information indicating whether or not a second anticancer agent different from the first anticancer agent administered to the cancer cells of the unspecified subject has been administered after the cancer cells of the unspecified subject acquired resistance to the predetermined first anticancer agent;

wherein the evaluation device acquires subject information including the state information about the cancer patient serving as the prediction target and the omics information of cells collected from the cancer patient as the input information:

wherein the evaluation device predicts an effect of the second anticancer agent acting on the cancer cells of the cancer patient after the cancer cells of the cancer patient acquired the resistance to the first anticancer agent; and wherein the evaluation device outputs a prediction result indicating that an anticancer agent whose anticancer effect in administration after acquisition of the resistance by the unspecified subject is greater than or equal to a predetermined threshold value is an anticancer agent effective at the time of administration after the cancer cells of the unspecified subject acquire the resistance.

2. The evaluation device according to claim 1, wherein the cells constituting the stroma include fibroblast cells.

3. The evaluation device according to claim 1, wherein the cells constituting the stroma further include vascular endothelial cells.

4. The evaluation device according to claim 1, wherein the evaluation device acquires subject information including the state information about the subject serving as the prediction target and the omics information of the cells collected from the subject as the input information, and wherein the evaluation device predicts the effect of the anticancer agent acting on cancer cells of the subject.

5. The evaluation device according to claim 1, wherein the evaluation device acquires a target drug information about an anticancer agent serving as a prediction target as the input information, and wherein the evaluation device predicts an effect of the anticancer agent designated in the target drug information acting on the cancer cells.

6. The evaluation device according to claim 1, wherein the evaluation device acquires target drug information about an anticancer agent serving as a prediction target as the input information, and wherein the evaluation device predicts an effect of the anticancer agent designated in the target drug information acting on the cancer cells for each cancer state in a patient.

7. The evaluation device according to claim 1, wherein the state information includes information indicating a type of cancer in the subject, wherein the evaluation device acquires target drug information about an anticancer agent serving as a prediction target as the input information, and wherein the evaluation device predicts an effect of the anticancer agent designated in the target drug information acting on the cancer cells for each type of cancer.

8. The evaluation device according to claim 1, wherein the administration performance information includes information about a combination of a plurality of anticancer agents administered to the three-dimensional cell structure, wherein the drug effectiveness information includes a result of determining an anticancer effect in the combination of the plurality of anticancer agents administered to the three-dimensional cell structure, wherein the evaluation device acquires target drug information corresponding to the combination of the plurality of anticancer agents serving as a prediction target as the input information, and wherein the evaluation device predicts an effect of the combination of the anticancer agents designated in the target drug information acting on the cancer cells of the subject.

9. The evaluation device according to claim 1, wherein the drug effectiveness information includes a result of determining whether or not the cancer cells of the subject have acquired resistance to a predetermined anticancer agent, wherein the evaluation device acquires subject information including the state information about the subject serving as the prediction target and the omics information of the cells collected from the subject as the input information, and wherein the evaluation device predicts a degree to which the cancer cells of the subject acquire the resistance to the predetermined anticancer agent.

10. The evaluation device according to claim 1, wherein, when acquiring the input information, the evaluation device sets information about the anticancer agent whose anticancer effect is predicted in association with the input information, and after making related predictions to the therapy using the anticancer agent with the input information and the prediction model, the evaluation device determines whether or not the anticancer effects have been predicted for all anticancer agents whose anticancer effects are desired to be predicted.

11. The evaluation device according to claim 1, wherein when making related predictions to the therapy using the anticancer agent with the input information and the prediction model, the evaluation device determines that the cancer cells of the cancer patient have acquired resistance to a specific anticancer agent if a result of determining the current anticancer effect indicates "ineffective" when it is determined that the specific anticancer agent had administered to the cancer patient in the past and the specific anticancer agent had been determined to have an anticancer effect with respect to the cancer patient, the determination result is stored as the drug effectiveness information in the evaluation device, and the drug effectiveness information with the determination result is included in the training data.

12. A learning device comprising:

at least one processor; and at least one memory including computer program code, where the at least one memory and the computer program code are configured, with the at least one processor, to cause the learning device to:

acquire:

learning data that is information about cancer in an unspecified subject; and training data that is information about an effect of an anticancer agent obtained by administering the anticancer agent to cells collected from the unspecified subject, and generate a prediction model for making predictions related to therapy using the anticancer agent by causing a learning model to perform supervised learning for a corresponding relationship between the learning data and the training data acquired by the learning information acquisition unit, wherein the information about the effect of the anticancer agent includes information whether or not the anticancer agent is effective against the cancer cells, information indicating whether the cancer cells have acquired resistance to the anticancer agent, and a result of performing human evaluation from a result of the administering the anticancer agent.

13. A non-transitory computer-readable storage medium storing a program for causing a computer to operate as the learning device according to claim 12, wherein the computer is allowed to function as each part provided in the learning device.

14. A prediction device comprising:

at least one processor; and at least one memory including computer program code, where the at least one memory and the computer program code are configured, with the at least one processor, to cause the prediction device to:

input information that is information about cancer in a subject serving as a prediction target; and make related predictions to therapy using an anticancer agent with the input information and a prediction model, wherein the prediction model is a model for making the prediction related to the therapy using the anticancer agent generated by causing a learning model to perform supervised learning for a corresponding relationship between learning data that is information about cancer in an unspecified subject and training data that is information about an effect of the anticancer agent obtained by administering the anticancer agent to cells collected from the subject, and wherein the information about the effect of the anticancer agent includes information whether or not the anticancer agent is effective against the cancer cells, information indicating whether the cancer cells have acquired resistance to the anticancer agent, and a result of performing human evaluation from a result of the administering the anticancer agent.

15. A non-transitory computer-readable storage medium storing a program for causing a computer to operate as the prediction device according to claim 14, wherein the computer is allowed to function as each part provided in the prediction device.

16. An evaluation method of evaluating an anticancer effect, the evaluation method comprising:

acquiring learning data that is information about cancer in an unspecified subject and training data that is information about an effect of an anticancer agent obtained by administering the anticancer agent to cells collected from the unspecified subject;

generating a prediction model for making a prediction related to therapy using the anticancer agent by causing a learning model to perform supervised learning for a corresponding relationship between the learning data and the training data acquired by the learning information acquisition unit;

storing the prediction model generated by the learning unit;

acquiring input information that is information about cancer in a subject serving as a prediction target; and making a prediction related to the therapy using the anticancer agent with the input information and the prediction model, wherein the acquiring training data comprises acquiring the information about the anticancer effect obtained by administering the anticancer agent to a three-dimensional cell structure including cancer cells collected from the unspecified subject and cells constituting a stroma as the training data;

wherein the acquiring learning data and training data comprises:

acquires the state information indicating the cancer state in the unspecified subject, omics information of the cells collected from the unspecified subject, drug information about the anticancer agent, and administration performance information about the anticancer agent administered to the three-dimensional cell structure as the learning data, and acquires drug effectiveness information that is a result of determining whether or not the anticancer agent administered to the three-dimensional cell structure is effective as the training data:

wherein the generating the prediction model comprises generating the prediction model for predicting an effect of the anticancer agent acting on cancer cells of the cancer patient on the basis of the state information in the cancer patient and the omics information of the cells collected from the cancer patient;

wherein the drug effectiveness information includes a result of determining whether or not the cancer cells of the unspecified subject have acquired resistance to a predetermined first anticancer agent;

wherein the administration performance information includes information indicating whether or not a second anticancer agent different from the first anticancer agent administered to the cancer cells of the unspecified subject has been administered after the cancer cells of the unspecified subject acquired resistance to the predetermined first anticancer agent;

wherein the acquiring input information comprises acquiring subject information including the state information about the cancer patient serving as the prediction target and the omics information of cells collected from the cancer patient as the input information;

wherein the making the prediction comprises predicting an effect of the second anticancer agent acting on the cancer cells of the cancer patient after the cancer cells of the cancer patient acquired the resistance to the first anticancer agent; and wherein the evaluation method further comprises outputting a prediction result indicating that an anticancer agent whose anticancer effect in administration after acquisition of the resistance by the unspecified subject is greater than or equal to a predetermined threshold value is an anticancer agent effective at the time of administration after the cancer cells of the unspecified subject acquire the resistance.

* * * * *